(12) United States Patent
Ishizaki et al.

(10) Patent No.: US 8,326,549 B2
(45) Date of Patent: Dec. 4, 2012

(54) CONTROL DEVICE, IMAGE FORMING DEVICE, WEAR DETECTING METHOD, PROGRAM, AND STORAGE DEVICE

(75) Inventors: Yuusuke Ishizaki, Kanagawa (JP); Takahisa Koike, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 414 days.

(21) Appl. No.: 12/654,030

(22) Filed: Dec. 8, 2009

(65) Prior Publication Data

US 2010/0179772 A1  Jul. 15, 2010

(30) Foreign Application Priority Data

Jan. 9, 2009  (JP) ................................. 2009-003476

(51) Int. Cl.
*G01B 3/44* (2006.01)
(52) U.S. Cl. ........................................................ 702/34
(58) Field of Classification Search ................ 702/34
See application file for complete search history.

(56) References Cited

U.S. PATENT DOCUMENTS

2005/0177321 A1* 8/2005 Wang et al. .................... 702/35
2008/0298856 A1* 12/2008 Koike ........................... 399/302

FOREIGN PATENT DOCUMENTS

| JP | 2005-221577 | 8/2005 |
|----|-------------|--------|
| JP | 2006-023403 | 1/2006 |
| JP | 2007-108517 | 4/2007 |
| JP | 2007-212719 | 8/2007 |
| JP | 4031745     | 10/2007 |

OTHER PUBLICATIONS

Abstract of JP 2005-091103 published on Apr. 7, 2005.

* cited by examiner

*Primary Examiner* — Cindy H Khuu
(74) *Attorney, Agent, or Firm* — Harness, Dickey & Pierce, P.L.C.

(57) ABSTRACT

A control device includes a transmission unit including a first gear rotating with a motor shaft and a second gear rotating with a rotating roller which drives a rotated body, a speed detecting unit for detecting the rotational speed of the rotated body or rotating roller, a motor controlling unit for maintaining a constant motor shaft rotational speed based on the rotational speed, a converting unit for converting the rotational speed to a relationship between a frequency contained in a variation of the rotational speed in association with time and a variation value of the rotational speed, and a wear detecting unit for detecting a predictor of wear of cogs in at least one of the first and second gears when the variation value at a specified frequency, determined based on the number of the cogs of the first gear and the motor shaft rotational speed, exceeds a threshold value.

13 Claims, 25 Drawing Sheets

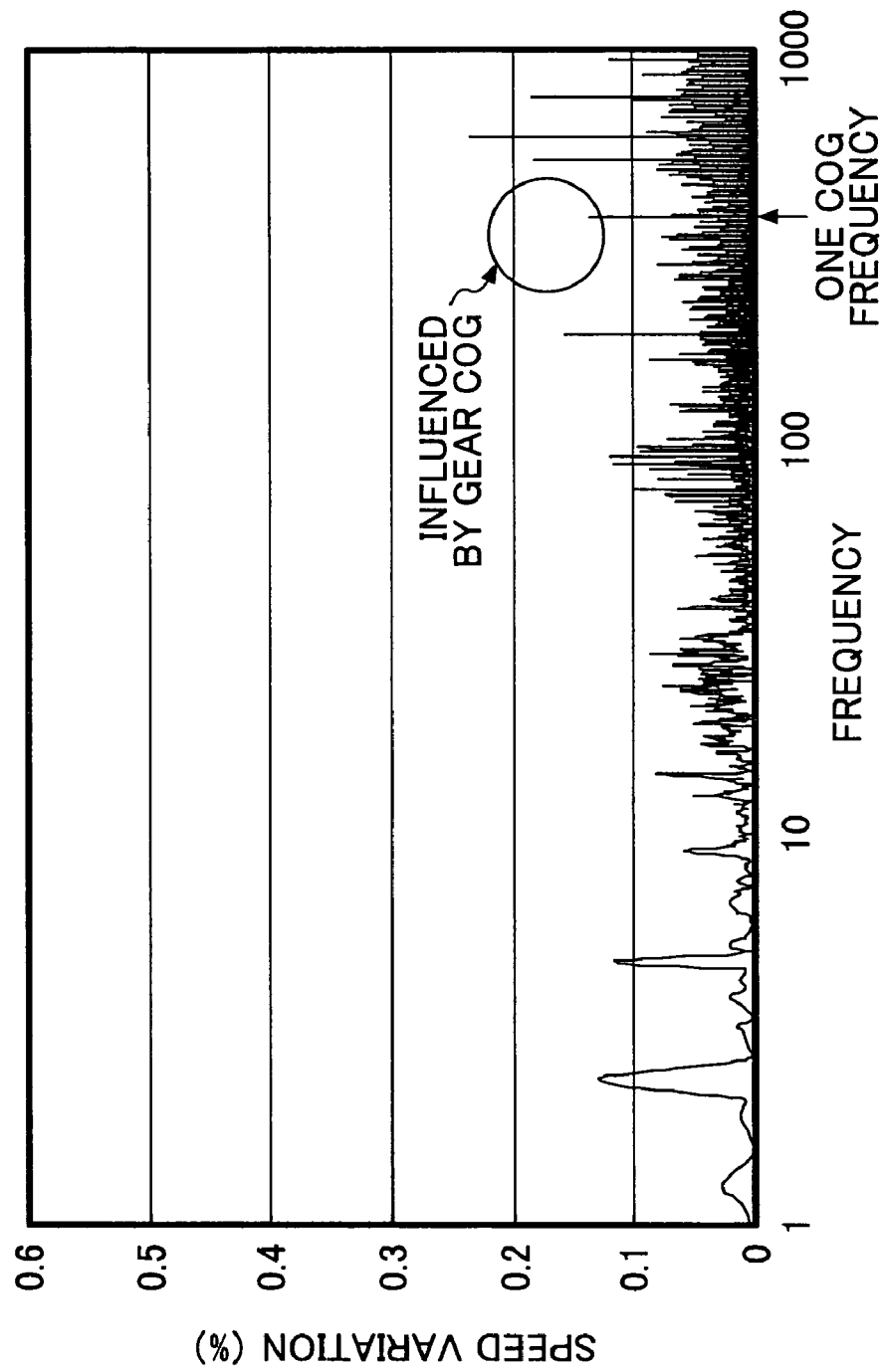

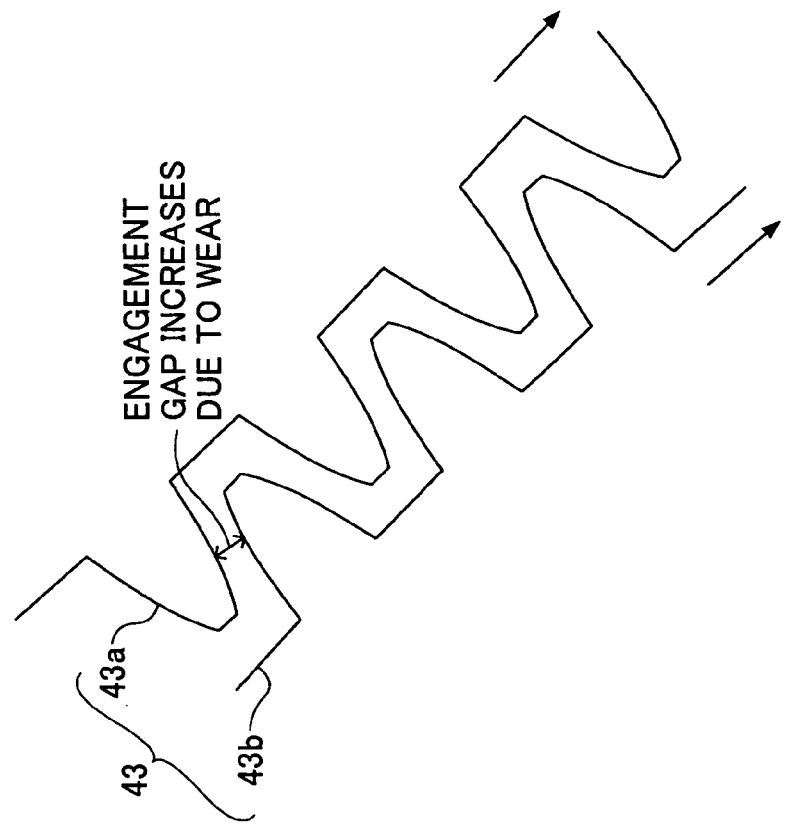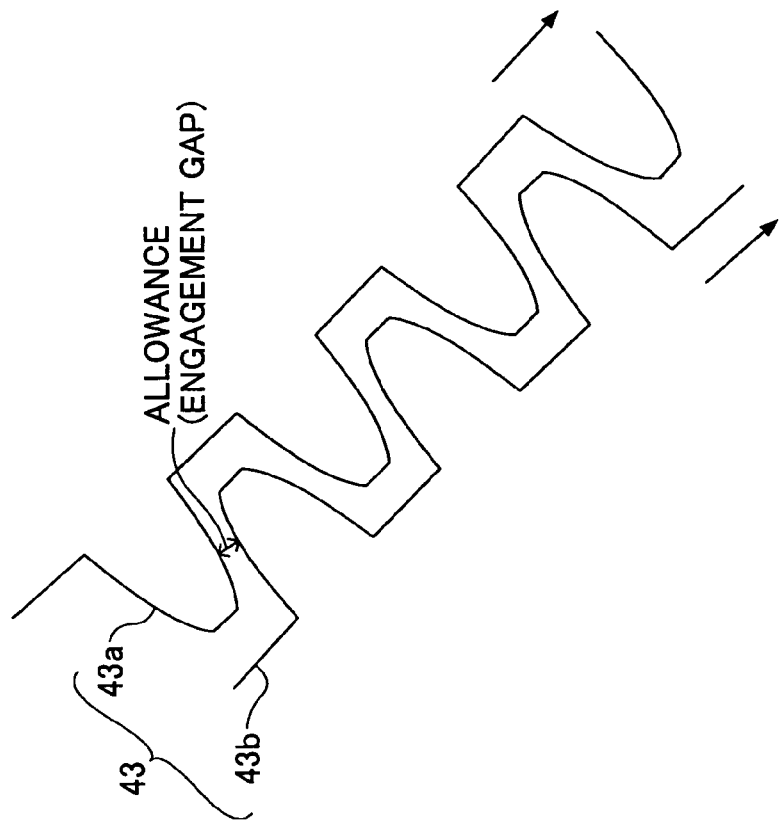

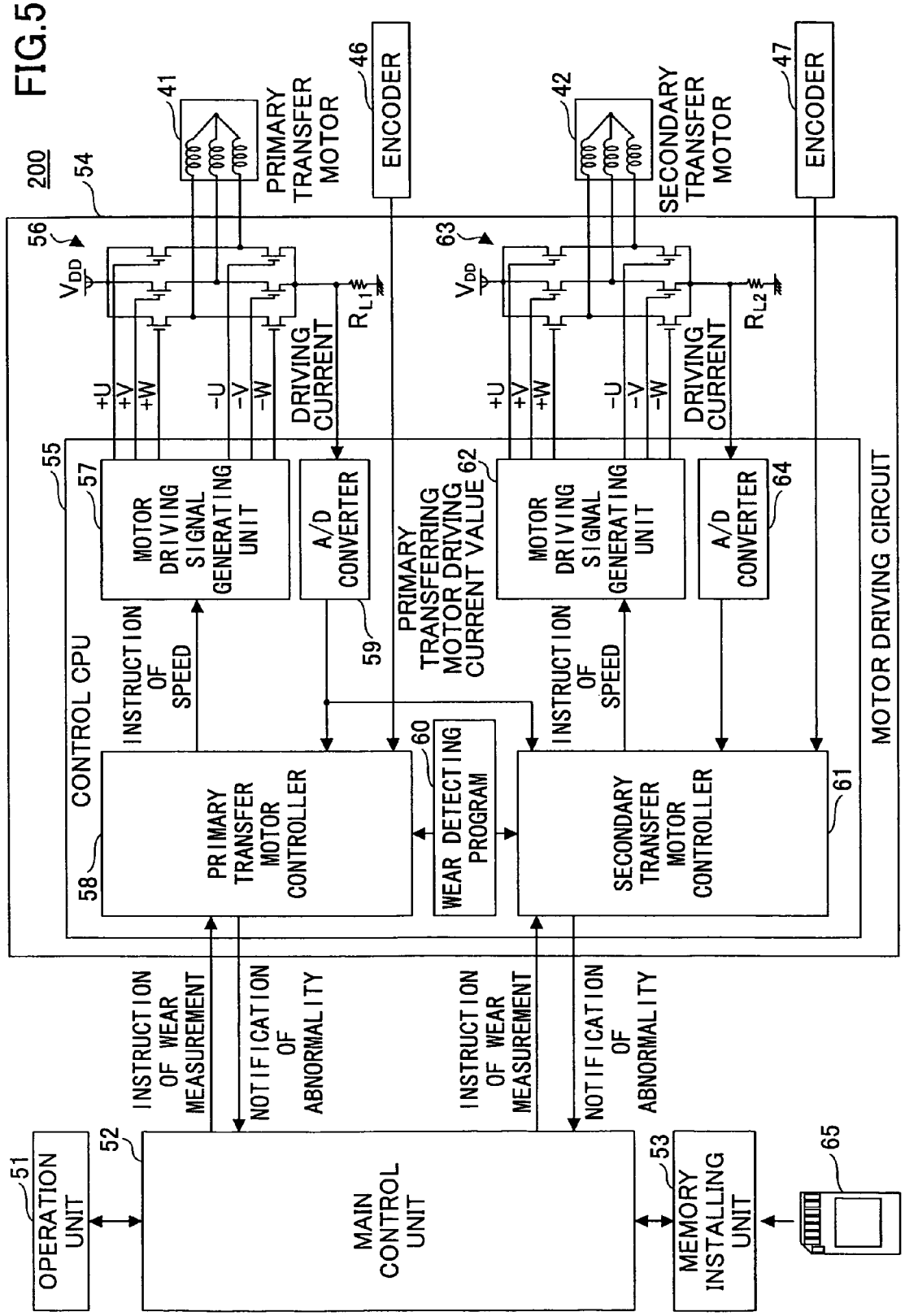

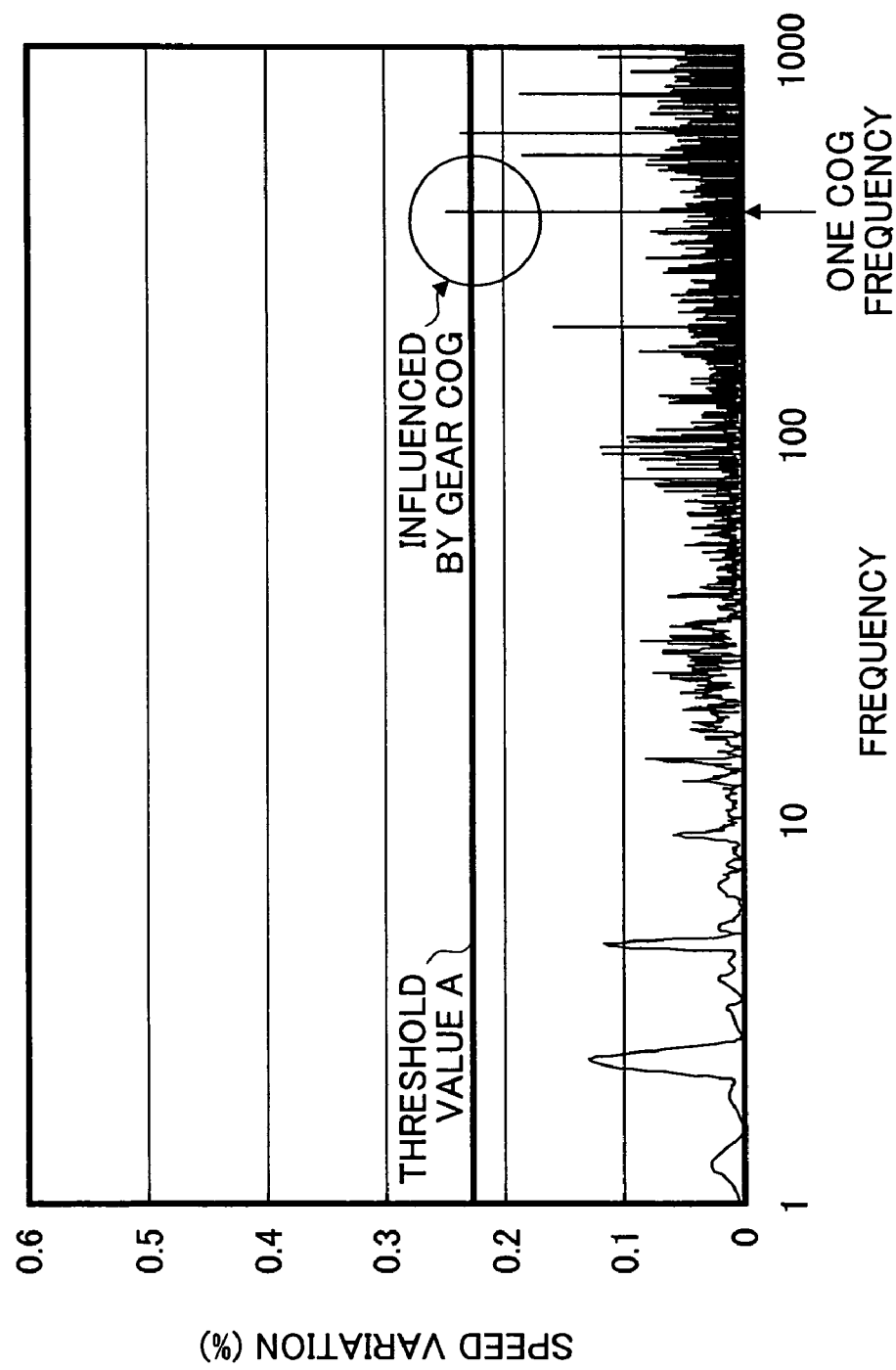

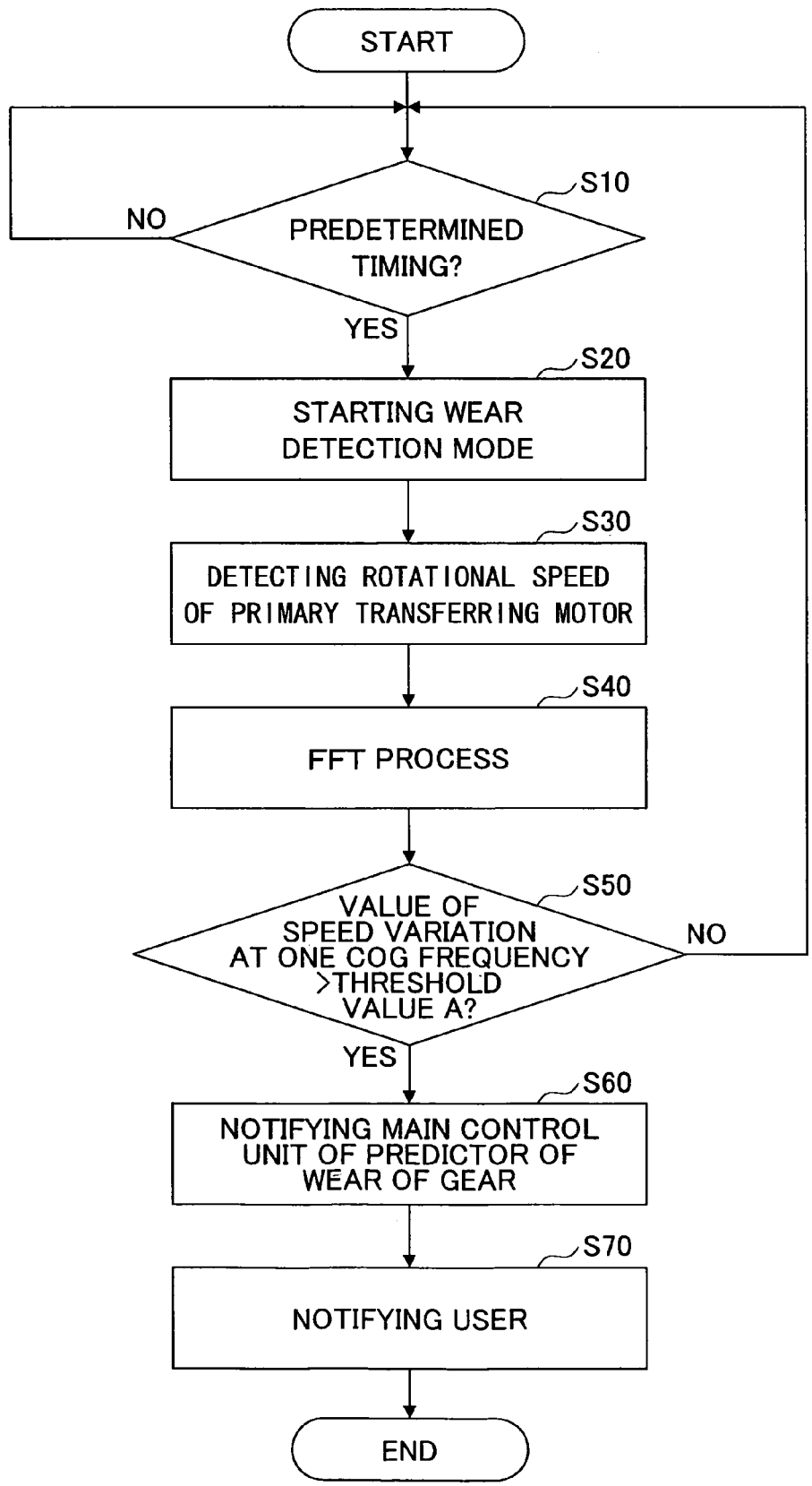

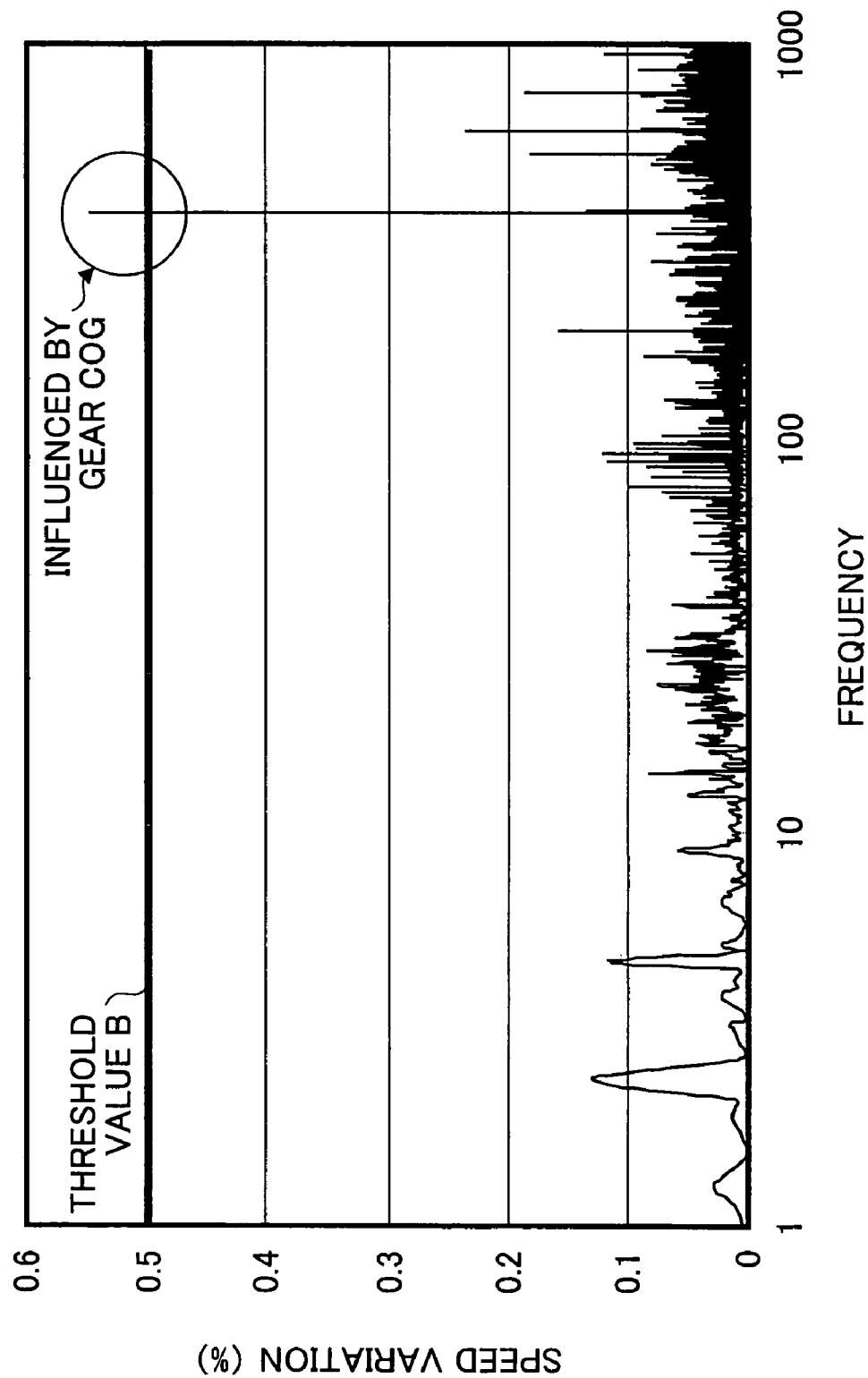

CONTROL DEVICE, IMAGE FORMING DEVICE, WEAR DETECTING METHOD, PROGRAM, AND STORAGE DEVICE

BACKGROUND OF THE INVENTION

1. Field of the Invention

The present invention generally relates to control device, an image forming device, a wear detecting method, a program, and a storage device, which enable early detection of wear of gears transmitting the rotation of a motor.

2. Description of the Related Art

In order to form an image having high image quality, an image forming device employs various measures. One of the measures is controlling a surface speed of an intermediate transferring belt to have a constant surface speed. When the surface speed varies while forming an image on one sheet of paper, image deformation, uneven shading, a color shift and so on are apt to occur. Therefore, there is a technique of controlling a motor such that the surface speed of the intermediate transferring belt is detected by an encoder or the like and the intermediate transferring belt may have a constant speed, as, for example, in Japanese Unexamined Patent Application Publication No. 2006-023403. In Japanese Unexamined Patent Application Publication No. 2006-023403, there is disclosed a technique of detecting a rotational angular displacement or a rotational angular speed of a driven rotating support body, which does not contribute to transmission of rotational driving force and forms a rotating support body of an intermediate transferring belt, extracting an amplitude and a phase of a belt AC component of the rotational angular displacement and the rotational angular speed having a frequency corresponding to a periodic thickness variation of the intermediate transferring belt in its peripheral direction, and controlling a driving rotating support body based on the amplitude and the phase. By this, it is possible to extract the amplitude and the phase of the belt AC component corresponding to the thickness variation in a belt peripheral direction with an arithmetic processing unit, which is relatively low in cost in comparison with the use of a Fourier transform, and to control the surface speed of the intermediate transferring belt to be constant.

As such, the surface speed can be controlled by accurately driving the motor. However, it is known that control of variation of a surface speed (for example, a range of several hundreds Hz) generated within a short time is difficult.

The variation of the surface speed of several hundreds hertz (Hz) is presumed to be caused by, for example, cogs which are components of a gear transmitting a rotational speed of the motor. For example, when the gear is excessively worn, a gap between a cog of the gear and a cog of another gear becomes large to cause large variation in the surface speed of the intermediate transferring belt. Japanese Unexamined Patent Application Publication No. 2005-221577 discloses a technique that detects excessive wear of the gear. In Japanese Unexamined Patent Application Publication No. 2005-221577, there is disclosed an image forming device which detects sudden speed variation from a high frequency component, which is obtained by statistically processing a result of a wavelet transformation of the rotational speed.

However, there is a problem in the image forming device of Japanese Unexamined Patent Application Publication No. 2005-221577 that wear of gears can be detected only in a case where the gear is excessively worn and lacks a cog. For example, it is impossible to detect the extent of variation of the surface speed caused by a slightly worn gear.

The image forming device ordinarily is not required to have image quality so high as to be affected by an engagement gap between cogs of the gears which are slightly worn. Further, gears are not worn to the extent of affecting image quality when a material of the gears is properly selected. However, the need to have high image quality has no limits, and there are many cases where further high speed and a large amount of printing are required. As a result, the engagement gaps between cogs caused by wear of gears influence the high image quality as the need for the higher image quality becomes strong. Further, wear of the gears is apt to occur as the rotational speed of the gears increases.

With respect to the need, if wear cannot be detected after a gear is excessively worn, printed materials continue to be output with gradually decreasing image quality, and a print obviously having wrong (abnormal) image quality is obtained when the wear is detected.

SUMMARY OF THE INVENTION

Accordingly, the Embodiments of the present invention provide a novel and useful control device, an image forming device, a wear detecting method, a program, and a storage device which can early detect wear of gears transmitting the rotation of a motor, solving one or more of the problems discussed above.

More specifically, the embodiments of the present invention may provide a control device controlling a rotational speed of a rotated body, the control device including a transmission unit configured to include a first gear rotating along with a motor shaft of a motor and a second gear rotating along with a rotating roller which drives the rotated body and to be formed by the first gear and the second gear, engaged to transmit rotation of the motor shaft, a speed detecting unit configured to detect the rotational speed of the rotated body or the rotating roller in association with time; a motor controlling unit configured to control the motor to have a constant motor shaft rotational speed based on the rotational speed, a converting unit configured to convert the rotational speed detected in association with the time to a relationship between a frequency contained in variation of the rotational speed in association with the time and a variation value indicative of magnitude of the variation of the rotational speed, and a wear detecting unit configured to detect a predictor of wear of cogs included in at least one of the first gear and the second gear when the variation value at a specified frequency, which is determined based on a number of the cogs of the first gear and the motor shaft rotational speed of the motor, exceeds a threshold value.

Additional objects and advantages of the embodiments will be set forth in part in the description which follows, and in part will be obvious from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 1A is a graph illustrating speed variation of a driving roller with respect to frequency, as an example.

FIG. 4A schematically illustrates engagement of gears, as an example.

FIG. 4B schematically illustrates engagement of the gears, as another example.

FIG. 5 is a block diagram of control device, as an example.

FIG. 7B graphically illustrates a relationship between a speed variation of a one cog frequency and a threshold value, as an example.

FIG. 8 is a flow diagram illustrating a procedure of detecting a predictor of wear with the control device, as an example.

FIG. 17 is a graph illustrating speed variation of a one cog frequency and a threshold value B, as an example.

DETAILED DESCRIPTION OF THE PREFERRED EMBODIMENTS

A description is given below, with reference to the FIG. 1 through FIG. 21 of embodiments of the present invention.

Hereinafter, the reference signs typically designate as follows: 14: intermediate transferring belt; 15,17: roller; 16: driving roller; 18: secondary transferring roller; 41: primary transferring motor; 42: secondary transferring motor; 43, 44: decelerating mechanism; 43a, 43b, 44a, 44b: gear; 46, 47: encoder; 51: operation unit; 52: main control unit; 53: memory installing unit; 54: motor driving unit; 55: control CPU; 56: inverter; 57, 62: motor driving signal generating unit; 58: primary transferring motor controller; 59, 64: A/D converter; 60: wear detecting program; 61: secondary transferring motor controller; 65: storage device; 100: image forming device; 110: printer; 120: paper feeding unit; 130: scanner unit; 140: ADF; and 200: control device.

Embodiment 1

Summary of Wear Detection

Figure 1B:
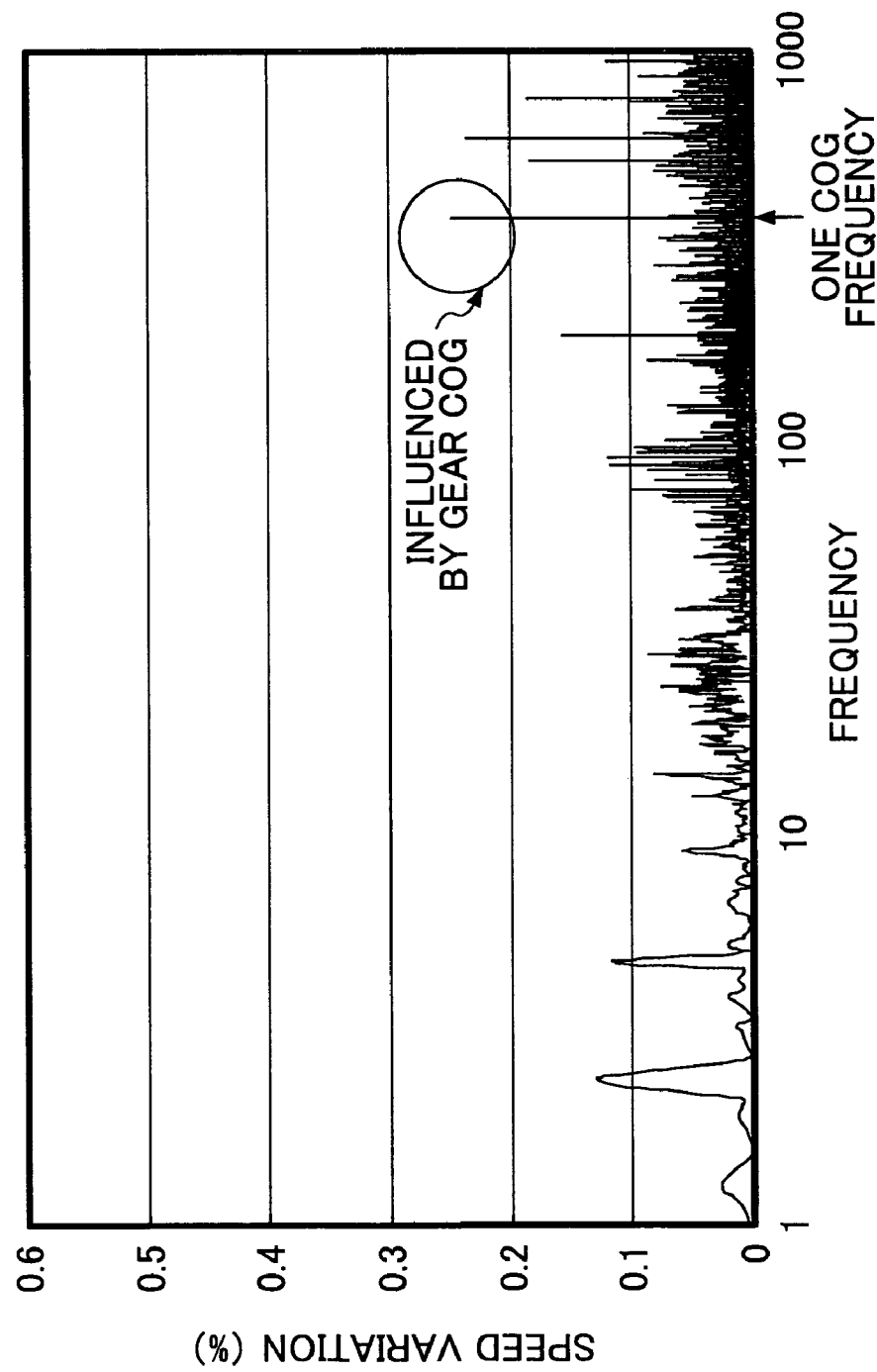
FIG. 1B is another graph illustrating speed variation of a driving roller with respect to frequency, as an example.

FIG. 1A and FIG. 1B are graphs illustrating the speed variation of a driving roller 16 with respect to frequency. FIG. 1A illustrates the speed variation when cogs of a gear are not worn. FIG. 1B illustrates the speed variation when cogs of a gear are slightly worn. As described in detail later, FIGS. 1A and 1B are obtained by applying a fast Fourier transform to a signal of the rotational speed of the driving roller 16, which supports an intermediate transferring belt 14. Hereinafter, speed variations with respect to the frequency band illustrated in FIGS. 1A and 1B are the results of applying the fast Fourier transform (FFT). In order to form an image having high image quality, it is preferable to limit the speed variation to be a predetermined value or less (e.g. 0.25% or less) along an entire frequency range.

Since the speed variation is caused every one or two rotations of a roller supporting an intermediate transferring belt 14 due to eccentricity of the roller, the speed variation appears at around the frequency of the rotational speed (1/sec) of the roller caused by the eccentricity of the roller. The speed variation appears at a frequency corresponding to a period causing the phenomenon. If the rotational speed changes every one second (1 sec), a value at around a frequency of one hertz (1 Hz) becomes large. If the rotational speed changes every zero point one second (0.1 sec), the value at around a frequency of ten hertz (10 Hz) becomes large.

The wear of a pair of engaged gears may arise in every cog of the pair of engaged gears. Therefore, variation is caused by each engagement gap between cogs of the engaged gears at around "the number of times obtained by multiplying the number of cogs of a gear on a motor side by a rotational speed of the gear (1/s)". The motor described in detail below is a primary transferring motor 41 for rotating an intermediate transferring belt 14. For example, when the number of the gear cogs is ten (10) and the motor rotates at thirty revolutions per second (30 rps), speed variation influenced by the engagement gap of the one cog of the gear appears about three hundreds (30×10=300) times per second, i.e. at a frequency of three hundreds hertz (300 Hz). Hereinafter, "one cog frequency" designates a frequency or frequencies at which an engagement gap between cogs of gears influences speed variation. In FIGS. 1A and 1B, the frequency of several hundreds hertz is "one cog frequency".

As illustrated in FIG. 1A, even when the cogs of the gear are not worn, a local maximum value appears at the one cog frequency. This is because an allowance (design tolerance) is provided in the gears.

When the gear cogs are worn and the allowance increases, the value of the speed variation at the one cog frequency becomes large. Said differently, the Fourier transform is applied to a signal of rotational speed of the driving roller 16, and the speed variation at the one cog frequency is monitored, so that it is possible to early detect the wear of gears. The adverb "early" here means that it is possible to detect when the cogs of the gear are slightly worn but image quality is not influenced by this slight wear. In Embodiment 1, such a detection of the slight wear is referred to as detection of a "predictor of wear".

(Image Forming Device 100)

Figure 2:
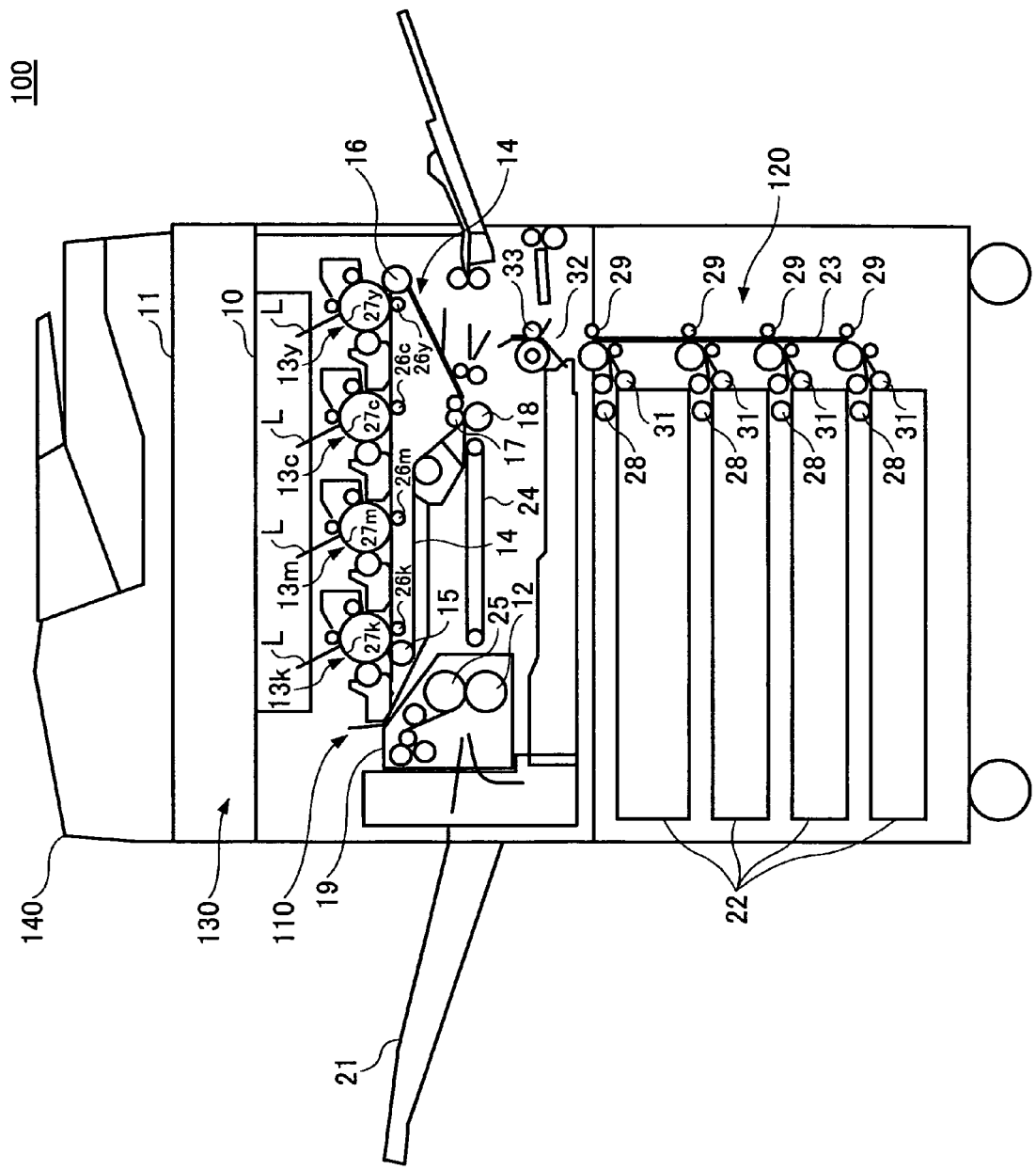
FIG. 2 schematically illustrates a structure of an image forming device, as an example.

FIG. 2 schematically illustrates a structure of an image forming device 100, as an example. The image forming device 100 of Embodiment 1 is exemplified as a multifunction peripheral (MFP). However, it may be a printer, a fax machine, a scanner machine or the like.

The image forming device 100 includes a printer unit 110, a paper feeding unit 120, a scanner unit 130, and an auto document feeder (ADF) 140. These are controlled by control device 200 described below (see FIG. 5). The ADF 140 feeds manuscripts one by one onto a contact glass 11. Then, when the scanner unit 130 reads the manuscripts, the manuscripts are ejected onto a catch tray.

The scanner unit 130 has an exposure lamp, an optical system which provides a manuscript image, and so on, not illustrated. The exposure lamp and the optical system are mounted on a carriage moving in a sub scanning direction, and a reflection light after exposure forms an image on a CCD. The CCD carries out photoelectric conversion to produce analog data, and the analog data are converted to digital image data by A/D conversion. Further, the image data are provided with gamma correction, shading correction, MTF correction, or the like. When a color manuscript is read out with color, the color manuscript is read while sequentially emitting LED lights of red, green and blue (RGB) or interposing color filters of red, green and blue (RGB) between a light and the color manuscript.

The image forming device 100 stores image data in a hard disk drive (HDD). A scanner device compresses the image data and sends the compressed image data to a destination via a telecommunication network or a personal computer (PC) via a network.

When the image data are printed, the control device 200 controls the printer unit 110 to form an image on a paper based on the stored image data. The printer unit 110 includes an exposure unit 10, image forming units 13$k$ thru 13$y$, an intermediate transferring belt 14, photoreceptors 27$k$ thru 27$y$, a secondary transferring roller 18, and a fuser unit 19. The intermediate transferring belt 14 is an endless belt supported by three rollers 15, 16 and 17. One of the three rollers is a driving roller 16 for driving the intermediate transferring belt 14. The other two rollers are driven rollers which rotate along with rotation (movement) of the intermediate transferring belt 14. In Embodiment 1, the roller 16 on the right end in FIG. 2 is exemplified as the driving roller 16. However, the roller on the left end or middle of FIG. 2 may be a driving roller. The roller 15 is generally called a "tension roller" and prevents the intermediate transferring belt 14 from slackening by applying an appropriate tension to the intermediate transferring belt 14. The intermediate transferring belt 14 rotates in a clockwise direction.

An image forming unit (13$k$) of a color of black, an image forming unit (13$m$) of a color of magenta, an image forming unit (13$c$) of a color of cyan and an image forming unit (13$y$) of a color of yellow are arranged in parallel in a radius direction of the intermediate transferring belt 14 on a side of the exposure device 10. The colors of black, magenta, cyan, and yellow are complementary each other. Such a structure is known as a "tandem type". The image forming units 13$k$ thru 13$y$ are charged with corresponding toners of these colors.

The exposure device 10 projects a laser beam modulated by image data for exposure of various colors to photoreceptors 27$k$ thru 27$y$ while scanning the laser beam in an axial direction of the photoreceptors 27$k$ thru 27$y$. Because the photoreceptors 27$k$ thru 27$y$ are charged by corresponding charging rollers, electric charges in parts projected by the laser beam are removed to thereby form electrostatic latent images corresponding to the image data of the colors on the photoreceptors 27$k$ thru 27$y$. The toners of corresponding colors are supplied from the image forming units 13$k$ thru 13$y$ while the photoreceptors 27$k$ thru 27$y$ with the formed electrostatic latent images rotate. Then, the photoreceptors 27$k$ thru 27$y$ have visible images made of the corresponding toners (toner image).

The toner images on the photoreceptors 27$k$ thru 27$y$ are transferred to the intermediate transferring belt 14 at positions (hereinafter, referred to as primary transferring positions) where the photoreceptors 27$k$ thru 27$y$ are in contact with the intermediate transferring belt 14. The photoreceptors 27$k$ thru 27$y$ are arranged opposite to pairs of intermediate transfer rollers 26$k$ thru 26$y$ and the image forming units 13$k$ thru 13$y$ relative to the intermediate transferring belt 14. The intermediate transferring rollers 26$k$ thru 26$y$ are in contact with an inner peripheral surface of, the intermediate transferring belt 14 thereby causing the intermediate transferring belt 14 to be in contact with surfaces of the photoreceptors 27$k$ thru 27$y$. By applying voltages to the intermediate transferring rollers 26$k$ thru 26$y$, there are generated intermediate transferring electric fields which cause the corresponding toner images on the photoreceptors 27$k$ thru 27$y$ to be transferred to the intermediate transferring belt 14.

By a function of the intermediate transferring electric fields, the toner images are formed on the intermediate transferring belt 14. The toner image of black transferred by the image forming units 13$k$ thru 13$y$ is carried to a next image forming unit 13$m$ together with the intermediate transferring belt 14. The image forming unit 13$m$ transfers and superposes the toner image of magenta onto the toner image of black formed on the intermediate transferring belt 14 and transfers the toner image of magenta. The superposed toner images of the two colors, transferred to the intermediate transferring belt 14, are transferred to next image forming units 13$c$, 13$y$. By an operation similar to the above, the image forming unit 13$c$ transfers and superposes a toner image of cyan on the superposed toner images of the two colors above on the intermediate transferring belt 14. The image forming unit 13$y$ transfers and superposes the toner image of yellow on the superposed toner images of the three colors. In this way, it is possible to form a superposed toner image of full colors on the intermediate transferring belt 14.

The paper feeding unit 120 includes plural paper feed trays 22 loaded with plural types of papers having different sizes, plural paired carrying rollers 29 which are appropriately provided on the way of a carrying route 23, and so on. Each of the paper feed trays 22 includes a paper feeding roller 28 which sequentially sends papers P as recording media accommodated in the paper feed tray 22 from an uppermost one of the papers P, and a separating roller 31 which sends the plural papers P after separating the overlapping plural papers P sent from the paper feeding roller 28 one by one.

The paired carrying rollers 29 send the papers P carried from the paper feed tray 22 to a paper feeding route 32 of the printer unit 110. The papers P fed to the paper feeding route 32 are sandwiched by paired resist rollers 33 provided on the way of the paper feeding route 32. The paired resist rollers 33 feed the papers P to a position of the secondary transferring roller 18 at a predetermined timing. The predetermined timing is when the superposed toner image of the full colors are carried to the position of the secondary transferring roller 18 by the movement (rotation) of the intermediate transferring belt 14.

The secondary transferring roller 18 is positioned opposite to a roller 17. The control device 200 causes the secondary transferring roller 18 to be in contact with the intermediate transferring belt 14 at the time of printing. Further, a secondary transferring electric field is produced by applying a voltage to the secondary transferring roller 18. The superposed toner image formed on the intermediate transferring belt 14 is transferred to the paper P reaching the secondary transferring roller 18 due to a function of the secondary transferring electric field. The secondary transferring roller 18 is controlled so that a speed along a periphery (hereinafter, referred to as peripheral speed) of a secondary transferring motor 42 (described below) is the same as a surface speed of the intermediate transferring belt 14 by the secondary transferring motor 42. By a driving force of the secondary transferring motor 42, variation of the surface speed of the intermediate transferring belt 14 is suppressed.

The paper P having a full color image formed on it is mounted on an endless belt 24 rotating in a counterclockwise direction and sent inside the fuser unit 19. The full color image is fixed, due to functions of heat and pressure, to the paper P while being interposed between a heating roller 12 and a pressing roller 25 provided in the fuser unit 19. The paper P with the fixed full color image is ejected onto a paper receiving tray 21 outside the image forming device 100. A residual toner on the intermediate transferring belt 14 remaining after the secondary transfer is forcibly removed from the belt surface by a belt cleaning device (not shown).

(A Primary Transferring Motor 41 Driving the Intermediate Transferring Belt 14 and a Decelerating (Gear-Down) Mechanism 43)

Figure 3:
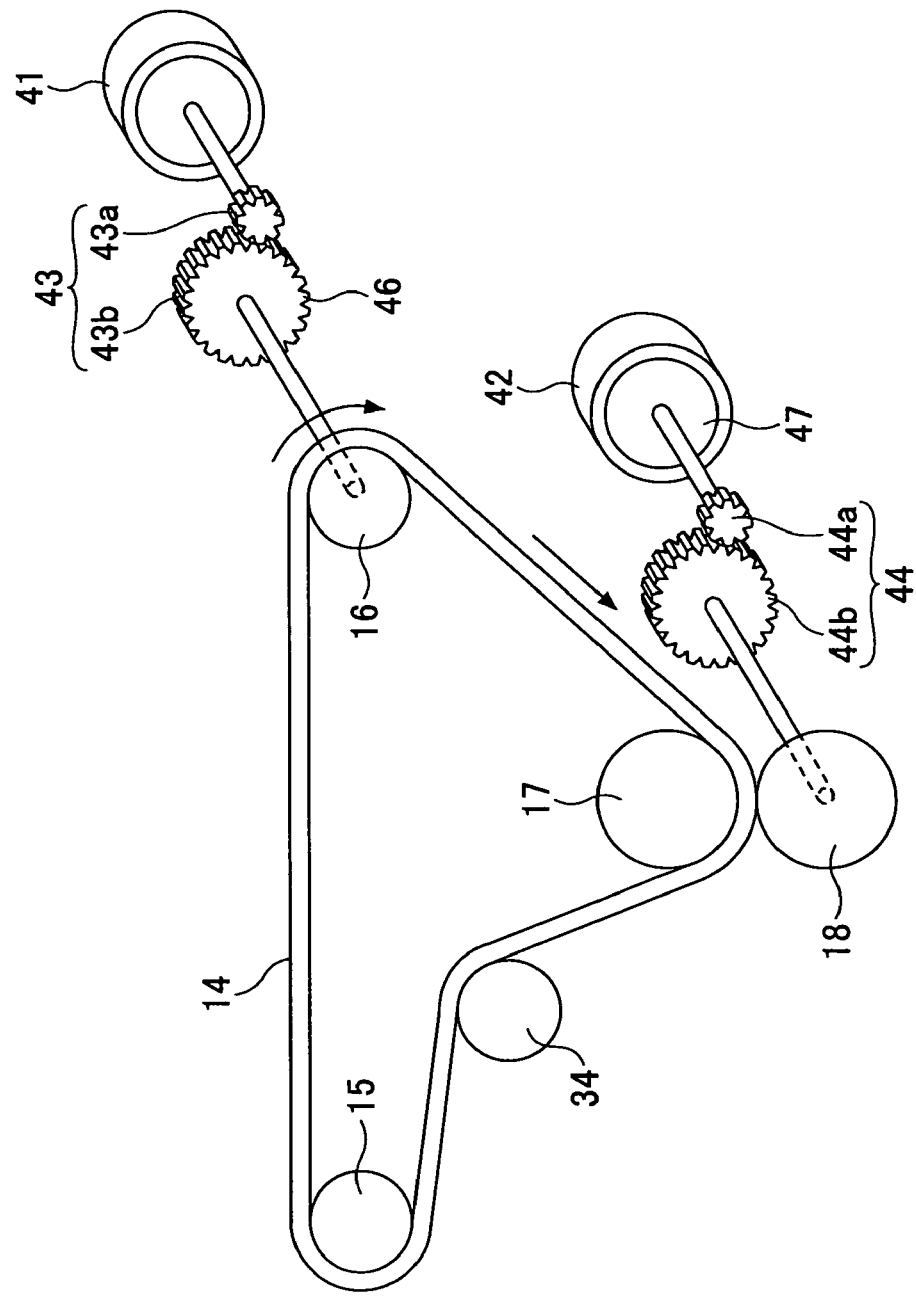
FIG. 3 schematically illustrates an intermediate transferring belt, a driving roller, and a secondary transferring roller illustrated in FIG. 2, as an example.

FIG. 3 schematically illustrates the intermediate transferring belt 14, the driving roller 16, and the secondary transfer roller 18 illustrated in FIG. 2, as an example. A tension roller 34 arranged inside a straight line connecting the rollers 15 and 17 applies a force to cause tension in the intermediate transferring belt 14. By the tension roller 34 causing tension, it is possible to reduce slippage between the intermediate transferring belt 14 and the driving roller 16 and to increase a frictional force between the intermediate transferring belt 14 and the driving roller 16 and a frictional force between the intermediate transferring belt 14 and the tension roller 34.

As described, the intermediate transferring belt 14 rotates in a clockwise direction driven by the driving roller 16. However, the driving roller 16 is rotated by the primary transferring motor 41. The primary transferring motor 41 includes a spur gear 43a rotated around a rotating shaft of the primary transferring motor 41 as a rotational center. The driving roller 16 includes a spur gear 43b rotated around a rotating shaft of the driving roller 16 as a rotational center. The decelerating mechanism 43 is formed by an engagement between the gears 43a and 43b. Since the rotational speed of the primary transferring motor 41 is transferred to the driving roller 16 by decelerating in response to a gear ratio of the decelerating mechanism 43, the driving roller 16 rotates at a rotational speed slower than that of the primary transferring motor 41. Here, a helical gear may be used in the decelerating mechanism 43.

Further, an encoder 46 is provided in the same axis as the rotational shaft of the driving roller 16, and a motor driving unit 54 (described below) controls the primary transferring motor 41 using, for example, a feedback control so that the rotational speed of the driving roller 16 becomes constant based on the rotational speed detected by the encoder 46. It is possible to control the primary transferring motor 41 to make the surface speed of the intermediate transferring belt 14 constant, based on the surface speed of the intermediate transferring belt 14 which is detected by a belt scale sensor provided on the intermediate transferring belt 14 at even intervals.

The secondary transferring roller 18 is driven by the secondary transferring motor 42. The secondary transferring motor 42 includes a spur gear 44a rotated around a rotating shaft of the secondary transferring motor 42 as a rotational center. The secondary transferring roller 18 includes a spur gear 44b rotated around a rotating shaft of the secondary transferring roller 18 as a rotational center. A decelerating mechanism 44 is formed by an engagement between the gears 44a and 44b. Since the rotational motion (speed) of the secondary transferring motor 42 is transferred to the secondary transferring roller 18 by decelerating in response to a gear ratio of the decelerating mechanism 44, the driving roller 18 rotates at a rotational speed slower than that of the secondary transferring motor 42. An encoder 47 for detecting the rotational speed is provided in the secondary transferring motor 42. The motor driving unit 54 controls the secondary transferring motor 42 so that a peripheral speed of the secondary transferring roller 18 becomes the same as the surface speed of the intermediate transferring belt 14, based on the rotational speed of the secondary transferring motor 42.

FIG. 4A and FIG. 4B schematically illustrate engagement of the gears 43a and 43b, as an example. FIG. 4A illustrates the gears 43a and 43b which are not worn yet. FIG. 4B illustrates the gears 43a and 43b which are worn. Since a slight allowance exists, a slight engagement gap exists between the gears 43a and 43b. The engagement gap further increases as the gears wear slightly more. When the engagement gap increases, the gear 43b is relatively irregularly engaged with the gear 43a. Therefore, the variation speed at the one cog frequency gradually increases along with progress of the wearing.

If both of the gears 43a and 43b are worn or either of the gears 43a and 43b is worn, the control device 200 can detect a predictor of wear. For example, when the gear 43b is made of a resin, the gear 43b wears easier (faster) than a gear 43a made of a metal.

Although the wear of the gears 43a and 43b of the decelerating mechanism 43 is described in Embodiment 1, it is also possible to detect the wear of the gears 44a and 44b of the decelerating mechanism 44 by applying the Fourier transform to the rotational speed of the secondary transferring roller 18.

(Structure of Control Device 200)

FIG. 5 is a block diagram of the control device 200, as an example. A primary transferring motor 41, an encoder 46, a secondary transferring motor 42, an encoder 47, and a main control unit 52 are connected to a motor driving circuit 54. The encoder 47 may be a frequency generator (FG) which outputs a pulse signal having a frequency corresponding to the rotational speed of the secondary transferring motor 42.

An operation unit 51 is connected to the main control unit 52. The operation unit 51 is, for example, a user interface enabling a menu display and selection from the menu display by integrally installing a liquid crystal display unit and a touch panel. Further, the operation unit 51 includes various hardware keys such as a selection key for switching among a scanner function, a fax function, and a copy function; and a numerical keypad, a start key, a reset key, and an electric power switch.

Both of the main control unit 52 and the motor driving circuit 54 may be mainly made of a computer including a CPU, a RAM, a ROM, an EEPROM, an input output interface, a flash memory, an application specific integrated circuit (ASIC), and so on. The motor driving circuit 54 includes control CPU 55, and is realized when the control CPU 55 executes a program (not shown) or an IC such as ASIC works. The motor driving circuit 54 includes a primary transferring motor controller 58, a motor driving signal generating unit 57, an inverter 56, an A/D converter 59, a secondary transferring motor controller 61, a motor driving signal generating unit 62, and an A/D converter 64.

The primary transferring motor controller 58 informs the motor driving signal generating unit 57 of a rotational speed. Although the rotational speed of the primary transferring motor 41 is constant in Embodiment 1, it is possible to variably control the rotational speed by requiring the primary transferring motor 58 to decrease the rotational speed when a heavy paper P is printed, for example. The primary transferring motor controller 58 calculates to determine a speed to be given (informed) to the motor driving signal generating unit 57 from the rotational speed detected by the encoder 46 and a target rotational speed (hereinafter, referred to as target speed) based on, for example, proportional integral derivative (PID) control. Here, the target speed is determined so that the surface speed of the intermediate transferring belt 14 becomes a constant predetermined value.

The motor driving signal generating unit 57 is connected to six field effect transistors (FET). The motor driving signal generating unit 57 compares the constant voltage determined based on the information (instruction) of the speed with, for example, a triangular wave (carrier wave) having a predetermined frequency, thereby determining a duty ratio of a PWM signal. The motor driving signal generating unit 57 generates the PWM signal having the duty ratio and outputs the signal to the six FETs. Thus, electric currents of a U-phase, a V-phase and a W-phase are formed by the FETs.

The A/D converter 59 applies an A/D conversion to a driving current flowing toward a resistor RL1, and outputs the converted driving current to the primary transferring motor controller 58 and the secondary transferring motor controller 61. The driving current is output to the secondary transferring motor controller 61. The primary transferring motor controller 58 compares the driving current with a reference value. When the driving current is determined to be excessive by comparing the driving current and the reference value, the primary transferring motor controller 58 instructs the motor driving signal generating unit 57 to restrict an output of the PWM signal. In this way, it is possible to prevent the FETs configuring the inverter 56 from being damaged. When wear of the gears 44a and 44b is detected, a driving current detected by the A/D converter 64 is output to the primary transferring motor controller 58.

Although control of the secondary transferring motor 42 with the secondary transferring motor controller 61 is the same as the primary transferring motor 41, the constant rotational speed, at which the secondary transferring motor 42 is controlled, is different from the rotational speed of the primary transferring motor 41. Although control of the secondary transferring motor 42 with the secondary transferring motor controller 61 is the same as the control of the primary transferring motor 41, a constant rotational speed, at which the secondary transferring motor 42 is controlled, is different from the rotational speed of the primary transferring motor 41. The rotational speed of the secondary transferring motor 42 is controlled such that the peripheral speed of the secondary transferring roller 18 is the same as the surface speed of the intermediate transferring belt 14. In this way, the same speeds are applied to a surface side and a back side of the paper P at the second transferring position.

(Wear Detecting Mode)

Figure 6A:
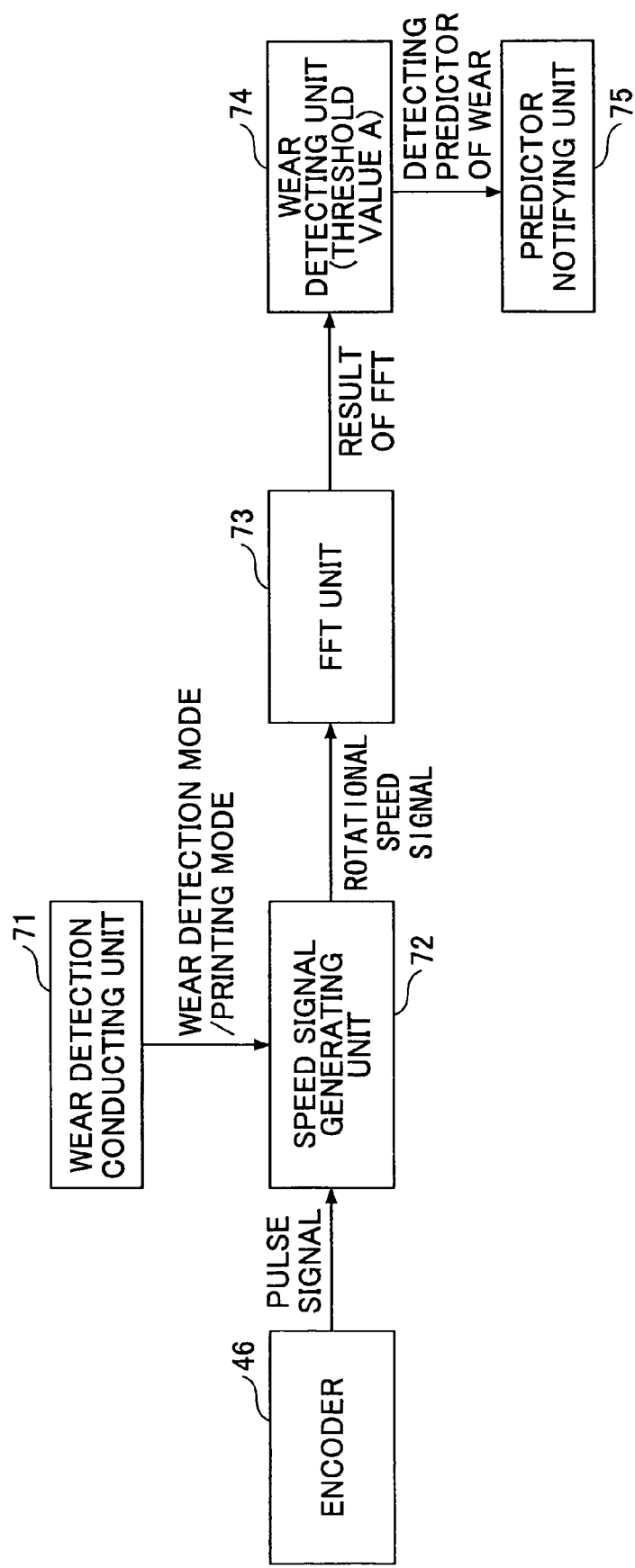
FIG. 6A is a functional block diagram specific to control device of Embodiment 1, as an example.
Figure 6B:
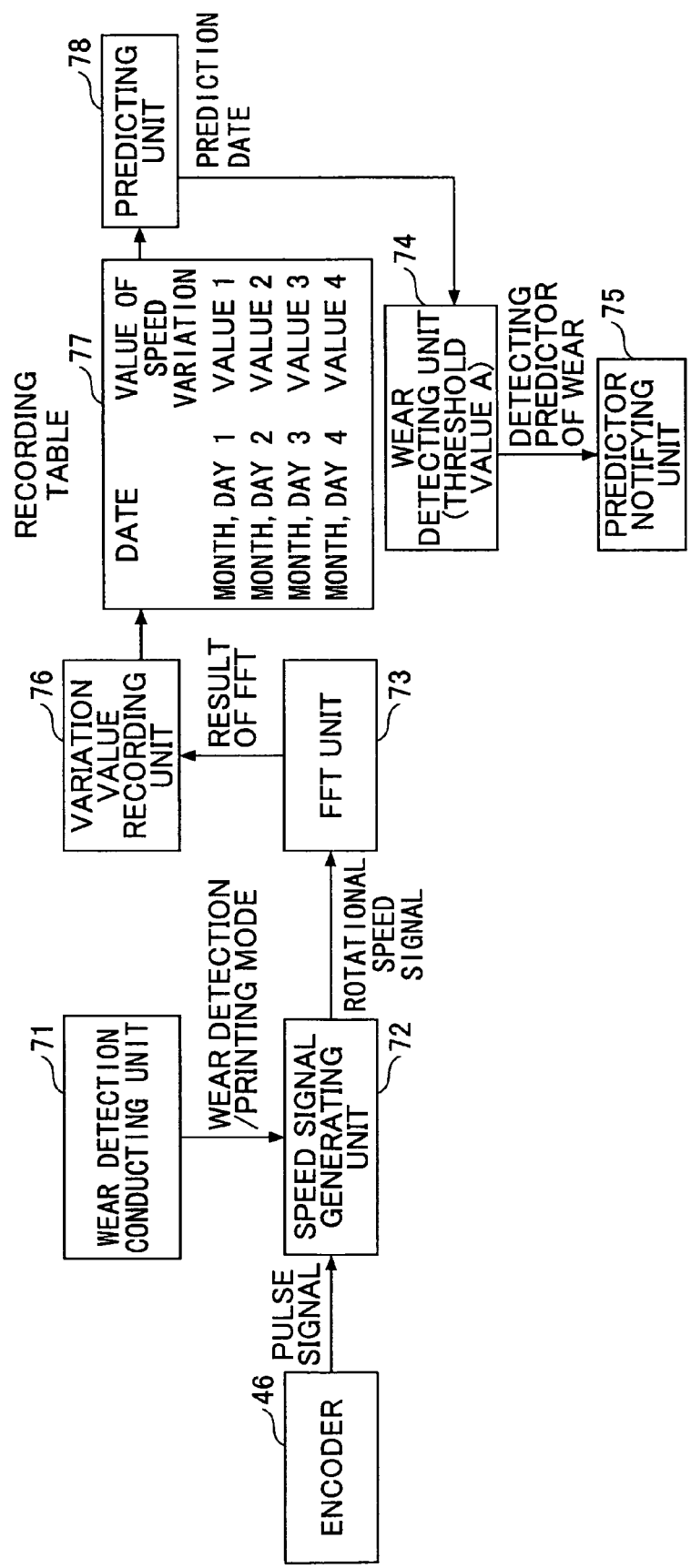
FIG. 6B is another functional block diagram specific to the control device of Embodiment 1, as an example.

FIG. 6A and FIG. 6B are functional block diagrams specific to the control device 200 of Embodiment 1, as examples. Various functions illustrated in FIGS. 6A and 6B are carried out when the control CPU 55 and a CPU of the main control unit 52 execute a wear detecting program. Only the CPU 55 or only the main control unit 52 may execute the wear detecting program 60.

The wear detecting program 60 stored in a flash memory or in a storage device 65 may be shipped. The storage device 65 is, for example, a semiconductor memory such as a universal serial bus (USB) memory, an SD memory card, and a multi media card; and an optical memory medium such as a compact disk read only memory (CD-ROM). Since the main control unit 52 reads out a program from the storage device 65, a memory installing unit 53 is connected to the main control unit 52. The wear detecting program 60 may be downloaded from a server connected via a network. In this case, the main control unit 52 executes a Web application, to thereby produce frames in compliance with a protocol such as Transmission Control Protocol/Internet Protocol (TCP/IP), and communicates with the server after being connected to the network via a local area network (LAN) card or the like.

A wear detection conducting unit 71 carries out a sequential process for detecting a predictor of wear. Hereinafter, a mode of carrying out the sequential process is referred to as a "wear detection mode". The wear detection conducting unit 71 detects whether predetermined timing comes and switches a mode of the image forming device 100 from a printing mode of forming an image on a paper P, for example, to a wear detection mode. Because priority is given to the printing mode, when the predetermined timing comes while printing, the wear detection conducting unit 71 switches the mode from the printing mode to the wear detecting mode. The predetermined timing is, for example, timing after the elapse of a predetermined period (for example, one month) from a previous detection of the predictor of wear, timing after printing a predetermined number of pages from the previous detection of the predictor of wear, and timing of printing a first time in the same day. It is possible to detect the predictor of wear on a substantially regular basis when the wear detection mode is carried out at the timing after the elapse of a predetermined period from the previous detection of the predictor of wear. In order to detect the predetermined timing, the wear detection conducting unit 71 acquires a previous date of the detection of the predictor of wear from a clock of the main control unit 52, acquires a page number from the previous time of the detection being carried out, and stores the previous date and the page number in flash memories. Besides the predetermined timing, it is preferable to enable a user or a service man doing maintenance to carry out the wear detection mode at the intended timing. For example, when an operation of detecting the predictor of wear is input from the operation unit 51, the wear detection conducting unit 71 switches the image forming device 100 to the wear detection mode. Further, it is also acceptable to input from the server an operation signal for switching the image forming device 100 to the wear detection mode.

In the detection of the predictor of wear of Embodiment 1, unlike Embodiment 2 described below, it is possible to detect the predictor of wear when the image is formed on the paper P. However, there is a likelihood that a resource of the motor driving circuit 54 is heavily loaded. Therefore, the wear detection conducting unit 71 detects the predictor of wear while an image is not yet formed on a paper P in Embodiment 1. However, it is also possible to detect the predictor of wear while forming the image on the paper P.

Figure 7A:
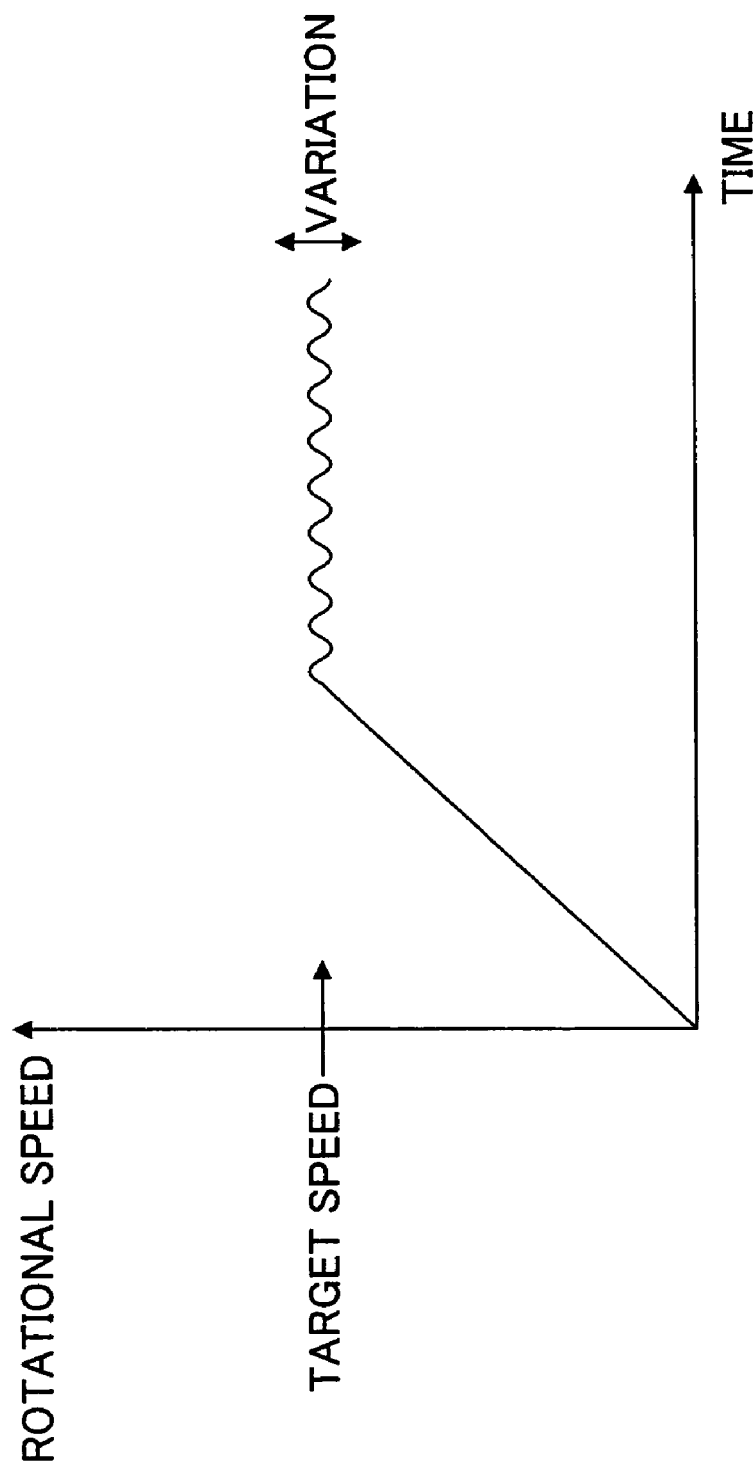
FIG. 7A graphically illustrates a signal of a rotational speed, as an example.
Figure 9:
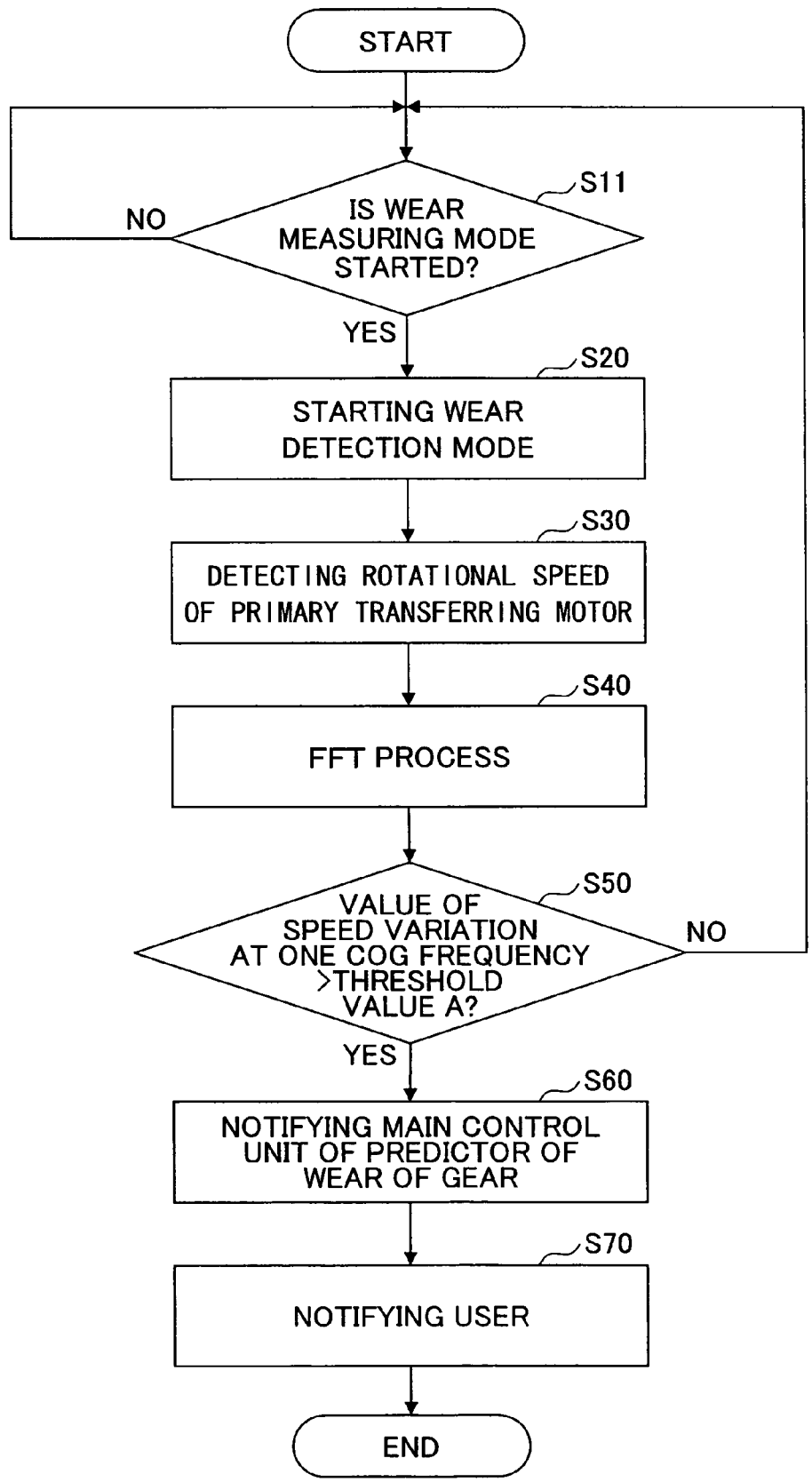
FIG. 9 is a flow diagram illustrating a procedure of detecting the predictor of wear with the control device, as a modified example.

The speed signal generating unit 72 generates a signal of the rotational speed of the driving roller 16 from a pulse signal output by the encoder 46. FIG. 7A graphically illustrates the signal of the rotational speed, as an example. When the wear control unit switches to the wear detection mode, the primary transferring motor controller 58 drives the primary transferring motor 41. In this way, the driving roller 16 reaches the target speed from a rotational speed of zero within a short time. Even if the driving roller 16 reaches the target speed, the rotational speed slightly varies around the target speed. In the variation, there are speed variations of various frequencies including a speed variation at the one cog frequency.

A FFT unit 73 applies a fast Fourier transform (FFT) to the signal of the rotational speed and calculates a result of applying the fast Fourier transform (FFT) illustrated in FIGS. 1A and 1B. As is known, a Fourier transform is a sequential calculation method for extracting frequencies included in signals using a Fourier integral. When there is a speed variation which periodicly occurs with a cycle, a result of calculation shows a peak on a frequency of an inverse number of the period of the cycle. Although the Fourier transform is applied to a signal infinitely continuing, a measurement time for the rotational speed is limited. Therefore, a discrete Fourier transform that discretely processes the signal is used. The discrete Fourier transform is provided to discretely transform discrete sampling columns {xn} as many as M obtained by sampling a signal with a constant interval $\Delta T$ at every $1/T=1/\Delta T \cdot M$. Fast Fourier transform (FFT) is one of Fourier transforms and an algorithm with its amount of calculation reduced.

Axes of ordinates in FIGS. 1A and 1B indicate a speed variation, obtained with the FFT, around the target speed in a ratio of percentage (%). When there is a period having a large speed variation, a result of the FFT shows a local maximum value at the frequency corresponding to the period.

The wear detecting unit 74 compares a value of the speed variation at the one cog frequency in the result of the FFT with a threshold value A, and detects the predictor of wear when the value exceeds the threshold value A. FIG. 7B graphically illustrates a relationship between the speed variation of the one cog frequency and the threshold value, as an example. In FIG. 7B, the value of the speed variation at the one cog frequency exceeds the threshold value due to wear of the gears 43*a* and 43*b*. When such a result of the FFT is acquired, the wear detecting unit 74 detects the predictor of wear.

Next, the threshold value A is explained. The threshold value A is not necessarily common to all of image forming devices 100. The threshold value can be changed in correspondence with the grade of the image forming devices 100 and print quality of the image forming devices 100. The print quality is selected by designating an object of print such as "general document", "image data", "desktop publishing (DTP)", and "computer assisted drawing (CAD)". For example, because image quality required for "general document" and image quality required for "CAD" are different, it is preferable that the threshold values A for detecting the predictor of wear be also different.

In determining the threshold value A, there are a method of registering the threshold value previously in the image forming device 100 and a method of setting the threshold value with the image forming device 100. In the former method, a manufacturer of the image forming devices 100 selects several image forming devices 100 having different ages of service and cumulative printed pages, and obtains a result of applying a FFT to these plural image forming devices 100 having different wear volumes of the gears 43*a* and 43*b*. Then, the manufacturer of the image forming devices 100 actually examines the image quality of documents printed on papers P and classifies the values of the speed variations into two groups of a first group and a second group. The first group has values of speed variation at the one cog frequency of image forming devices with their image quality influenced. The second group has values of speed variation at the one cog frequency of image forming devices with their image quality not influenced.

At the smallest value of the speed variation of the first group, the image quality may be influenced, and at the largest value of the speed variation of the second group, the image quality may not be influenced. Therefore, a value smaller than the smallest value of the speed variation of the first group and larger than the largest value of the speed variation of the second group the threshold value A may be set as the threshold value A. The manufacturer of the image forming devices 100 determines, for example, the following values as the threshold value A: less than the smallest value of the speed variations of the first group, a middle point value of the largest values of the speed variations of the second group, a value ten percent (10%) smaller than the smallest value of the speed variations of the first group, and the largest value of the speed variations of the second group. The manufacturer of the image forming devices 100 carries out such operations for every grade of the image forming devices 100 and print quality of the image forming devices 100.

In the latter method of setting the threshold value with the image forming device 100, an average value of the speed variations at the one cog frequency in a predetermined time period (e.g. about one month) after sell-in of control devices 200 is acquired and stored. Then, the control device 200 determines a value acquired by multiplying the average value by a coefficient as the threshold value A. The coefficient is a value larger than one. For example, when a small value of about 1.2 thru 2 is used as the coefficient, the predictor of wear may be detected. With the latter method, it is unnecessary to consider interindividual differences between the speed variations at the one cog frequency in an early stage, and the threshold value A is determined using the image forming device 100. Therefore, cost can be prevented from increasing. Further, because it is possible to adjust an image standard for detecting the predictor of wear by changing the coefficient, the threshold value A for every grade of the image forming device 100, print quality of each one of the image forming devices 100 and so on can easily be determined.

When the wear detecting unit 74 detects the predictor of wear, the predictor notifying unit 75 notifies a user of detection of the predictor of wear of the gears 43*a* and 43*b*. Modes of the notification are, for example, display of a message of "slight wear of gear is detected" on a liquid crystal display unit integrally formed with the operation unit 51, lighting an alarm lamp, sending information indicative of detection of the predictor of wear to a server of a maintenance service, or the like. When the information is sent to the server of a maintenance service, a serviceman communicates with a user by phone or fax.

(Operating Procedure)

FIG. 8 is a flow diagram illustrating a procedure of detecting the predictor of wear with an image forming device 100 of Embodiment 1. The flow diagram in FIG. 8 starts when a power source of the image forming device 100 is turned on, and the main control unit 52 and the motor driving circuit 54 completely start up.

The wear detection conducting unit 71 determines whether a predetermined timing comes in S10. After the predetermined timing comes in YES of step S10, for example, a predetermined time period elapses from a previous detection of wear, the image forming device 100 is switched to a wear detection mode by the wear detection conducting unit 71 in S20. After changing to the wear detection mode, the motor driving circuit 54 causes the primary transferring motor 41 to constantly rotate at the target speed.

The speed signal generating unit 72 generates a signal of the rotational speed of the driving roller 16 from a pulse signal output by the encoder 46 in step S30. The time duration while the signal of the rotational speed is generated is about the time duration while the intermediate transferring belt 14 rotates one turn. By this, the speed variation can be detected while reducing the influence of rotational position of the intermediate transferring belt 14.

The FFT unit 73 applies a FFT process to the signal of the rotational speed and calculates a result of the FFT process in S40. The wear detecting unit 74 determines whether a value of the speed variation at the one cog frequency is larger than the threshold value A in step S50.

When the value of the speed variation at the one cog frequency is not larger than the threshold value A in NO of step S50, the wear detection conducting unit 71 finishes the wear detection mode. In this way, the image forming device 100 returns to the printing mode. Therefore, the wear detection conducting unit 71 waits for a next predetermined timing in step S10. When the value of the speed variation at the one cog frequency is larger than the threshold value A in YES of step S50, the predictor notifying unit 75 notifies the main control unit 52 of the predictor of wear in step S60. In receipt of the notification, the main control unit 52 displays a message on, for example, the operation unit 51 in step S70. Therefore, by comparing the value of the speed variation at the one cog frequency with the threshold value A, the predictor of wear may be detected.

(Modified Example of Operating Procedure)

The wear detection conducting unit 71 switches the image forming device to the wear detection mode when the user or the serviceman operates the operation unit 51. Said differently, the wear detection mode is started due to operations in steps S11 and S20.

The following processes are similar to those in FIG. 8. However, because it is unnecessary to wait for the predetermined timing in FIG. 9, when a value of the speed variation at the one cog frequency is not larger than the threshold value A in NO of step S50, the wear detection conducting unit 71 finishes the process itself. Therefore, when the user or the serviceman compares the value of the speed variation at the one cog frequency with the threshold value A at a predetermined timing, the predictor of wear may be detected.

(Prediction of the Predictor of Wear)

Further, the image forming device 100 of Embodiment 1 not only compares the threshold value A with the value of the speed variation at the one cog frequency but also predicts the predictor of wear.

Referring back to FIG. 6B, FIG. 6B is the functional block diagram specific to the control device 200, as an example. In FIG. 6B, the same reference signs are used for portions the same as those in FIG. 6A, and descriptions of these portions are omitted.

The block diagram of FIG. 6B further includes a variation value recording unit 76, a recording table 77 and a predicting unit 78. The variation value recording unit 76 records "date" and corresponding "variation value" on the recording table 77 every time results of the FFT process are obtained. This "variation value" is a value of the speed variation at the one cog frequency. The recording table 77 is recorded on, for example, a flash memory of the main control unit 52 or the motor driving circuit 54. The value of the speed variation is recorded regardless of whether a trigger of recording is the predetermined timing or there is an operation from the operation unit 51. In this way, "date" and "variation value" are additionally recorded on the recording table 77 every time the image forming device is changed to the wear detection mode and the result of the FFT process is obtained. In this, the "date" is obtained from a clock of the main control unit 52. It is possible to record day and hour instead of the "date".

Figure 10:
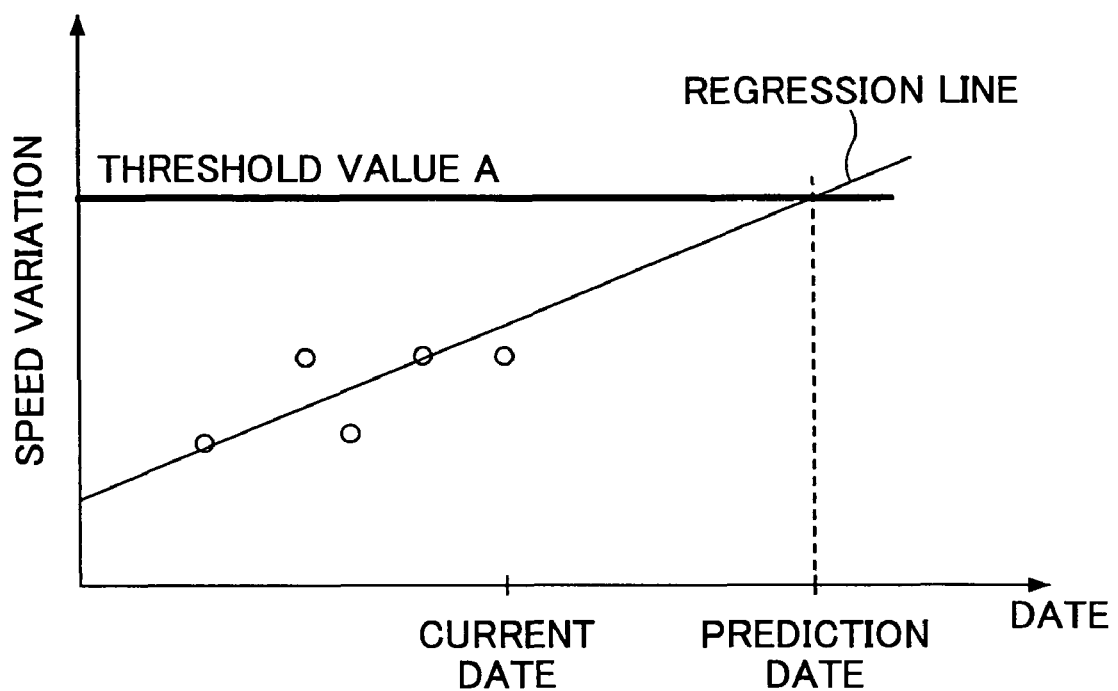
FIG. 10 is a graph illustrating a scatter diagram and a predicted date, as an example.

The predicting unit 78 predicts a date (hereinafter, referred to as prediction date) when the predictor of wear may be detected in reference to the recording table 77 after the results of the FFT process are obtained. FIG. 10 is a graph illustrating a scatter diagram and a predicted date, as an example. The predicting unit 78 calculates a regression line or regression curve by a method such as least squares from a scatter diagram of values of the speed variation relative to the date. The predicting unit 78 determines a date at an intersection point between the regression line or the regression curve and the threshold value A as a prediction date. Thus, it is possible for the prediction unit 78 to calculate a periodic margin between a current date and the prediction date.

The predictor notifying unit 75 notifies the user of the periodic margin between the current date and the prediction date when, for example, the periodic margin becomes short, e.g. one month. Further, the predictor notifying unit 75 may notify the user of residual days from the current date to the prediction date. Thus, it is possible to predict an event in which the predictor of wear may be detected at a time much earlier than a time when the predictor of wear is actually detected.

Figure 11:
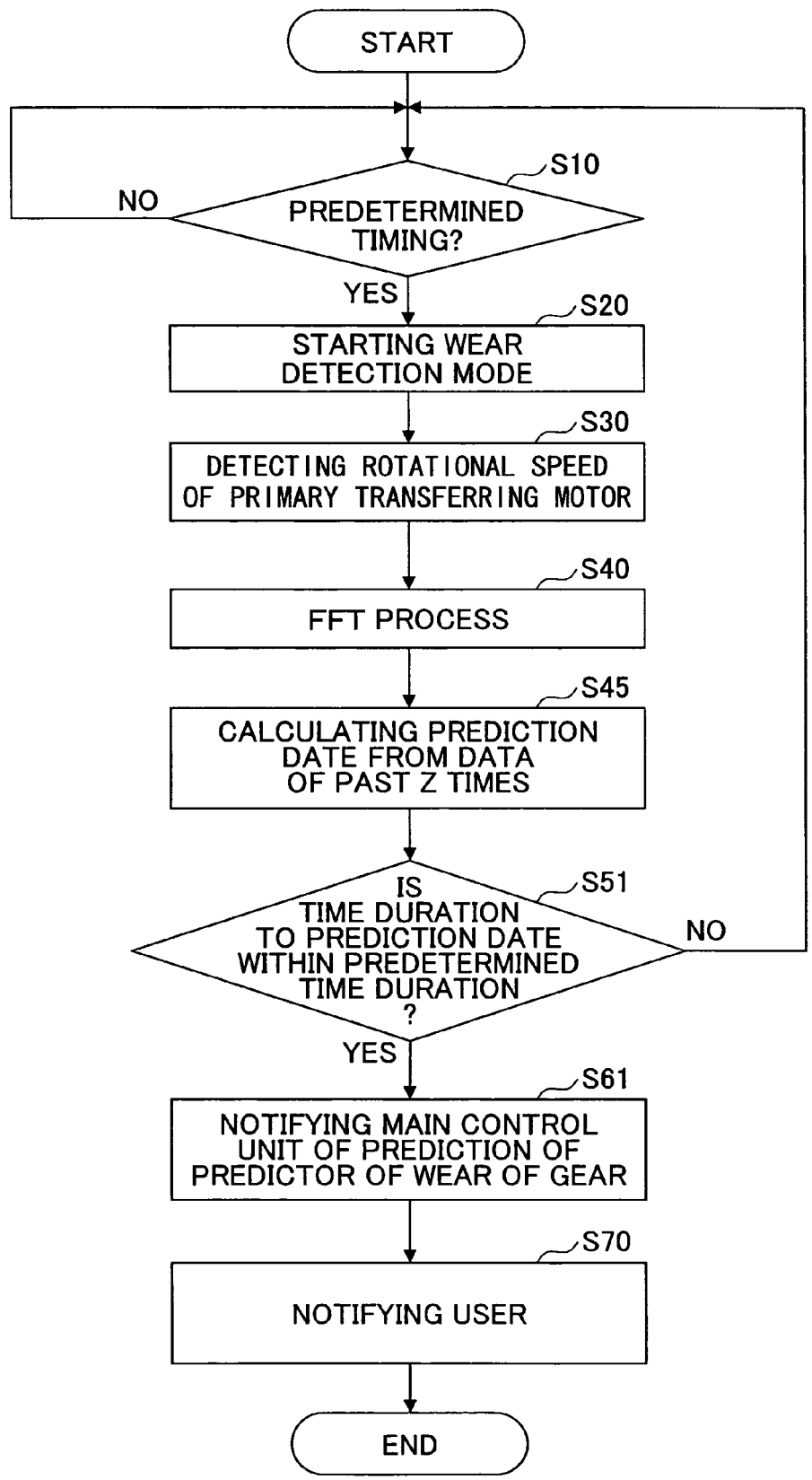
FIG. 11 is a flow diagram illustrating a procedure of detecting the predictor of wear with control device of Embodiment 2, as an example.

FIG. 11 is a flow diagram illustrating a procedure of detecting the predictor of wear with an image forming device 100 of Embodiment 1, as an example. The flow diagram in FIG. 11 starts when a power source of the image forming device 100 is turned on, and the main control unit 52 and the motor driving circuit 54 completely start up, for example.

The wear detection conducting unit 71 determines whether the predetermined timing comes in step S10. After the predetermined timing comes in YES of step S10, for example, a predetermined time period elapses from a previous detection of wear, and the image forming device 100 is switched to the wear detection mode by the wear detection conducting unit 71 in step S20. After changing to the wear detection mode, the motor driving circuit 54 causes the primary transferring motor 41 to constantly rotate at the target speed. The switching to the wear detection mode may be done by operating the operation unit 51.

The speed signal generating unit 72 generates a signal of the rotational speed of the driving roller 16 from a pulse signal output by the encoder 46 in step S30. Time duration while the signal of the rotational speed is generated is about the time duration while the intermediate transferring belt 14 rotates one turn. By this, the speed variation can be detected while reducing the influence of rotational position of the intermediate transferring belt 14.

The FFT unit 73 applies a FFT process to the signal of the rotational speed and calculates a result of the FFT process in S40. The variation value recording unit 76 records a current date and a value of the speed variation on the recording table 77.

The prediction unit 78 calculates the prediction date based on data of past Z times. Here, the Z times are a number sufficient for calculating a regression line, for example five to ten times. It is also possible to calculate the regression line by using all the past data.

The wear detecting unit 74 determines whether time duration to the prediction date is within the predetermined time duration in step S51.

When the time duration is not within the predetermined time duration in NO of step S51, the wear detection conducting unit 71 finishes the wear detection mode. In this way, the image forming device 100 returns to the printing mode. Therefore, the wear detection conducting unit 71 waits for the next predetermined timing in step S10. When the time duration until the prediction date is within the predetermined time duration in YES of step S51, the predictor notifying unit 75 notifies the main control unit 52 of the prediction of the predictor of wear of the gears 43a and 43b in step S61. In receipt of the notification, the main control unit 52 displays a message on, for example, the operation unit 51 in step S70. Therefore, it is possible to early predict an event in which the predictor of wear may be detected by calculating the prediction date when the speed variation at the one cog frequency exceeds the threshold value A in use of values of past speed variations.

As described above, the image forming device 100 of Embodiment 1 applies the Fourier transform to the rotational speed of the driving roller 16 and monitors the speed variation at the one cog frequency, to thereby detect the predictor of wear of the gears 43a and 43b.

Embodiment 2

In Embodiment 1, the control of the primary transferring motor in the wear detection mode has not been referred to. However, by appropriately controlling the primary transferring motor 41, it becomes possible to make the speed variation clearly emerge even though only slight wear enabling detection of the predictor of wear exists.

Next, there is described control device 200 for controlling a rotational speed of the primary transferring motor 41 so that speed variation at one cog frequency is amplified in the image forming device 100 of Embodiment 1. In Embodiment 2, such control is referred to as "amplifying control". In the amplifying control, a motor driving circuit 54 controls the rotational speed of a secondary transferring motor 42 so that an electric current of the primary transferring motor 41 becomes zero (0). In a manner similar to Embodiment 1, the speed variation is detected for the frequency band, to thereby detect the predictor of wear of the gears 43a and 43b.

Figure 12:
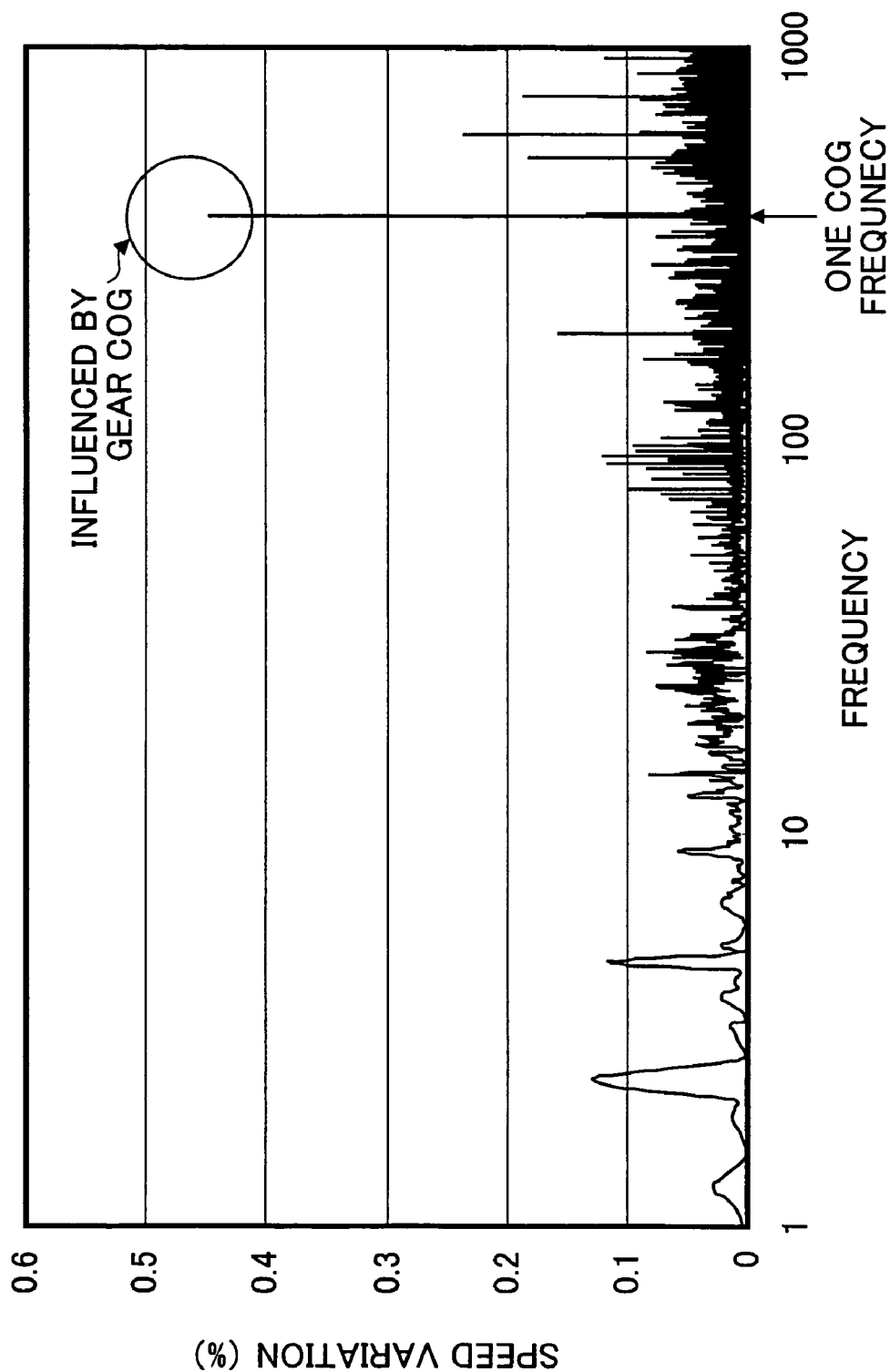
FIG. 12 is a graph illustrating the speed variation of a driving roller with respect to frequency during an amplifying control of a motor, as an example.

FIG. 12 is a graph illustrating speed variation of a driving roller 16 with respect to a frequency band during the amplifying control. The one cog frequency is the same as that in Embodiment 1. The value of the speed variation at the one cog frequency is larger than the value in FIG. 1B under progressed wear. Therefore, the image forming device 100 of Embodiment 2 can amplify the speed variation and detect the amplified speed variation, so that detection of the predictor of wear becomes much easier than in Embodiment 1.

(Control of the Primary Transferring Motor 41 in the Printing Mode)

Figure 13:
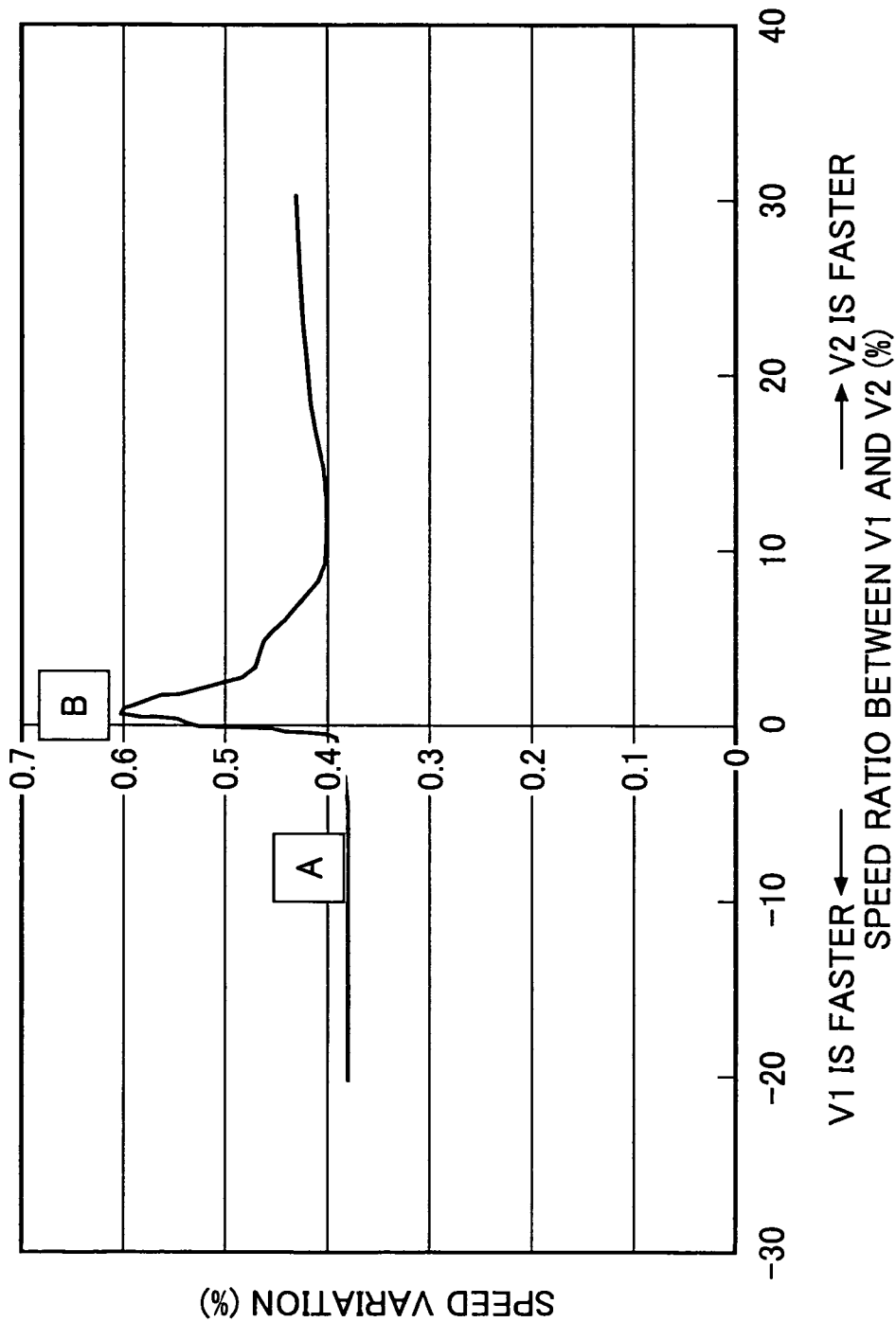
FIG. 13 is a graph illustrating a relationship of a speed ratio between a surface speed V1 of an intermediate transferring belt controlled by a primary transferring motor and a peripheral speed V2 of a secondary transferring rotor controlled by a secondary transferring motor to speed variation, as an example.

For comparison, control of the primary transferring motor 41 in the printing mode is described. FIG. 13 is a graph illustrating a relationship of a speed ratio between a surface speed V1 of an intermediate transferring belt 14 controlled by a primary transferring motor 41 and a peripheral speed V2 of a secondary transferring rotor controlled by a secondary transfer motor 42 with speed variation, as an example. Although it is described that the motor driving circuit 54 controls the surface speed V1 and the peripherals speed V2 so that the surface speed V1 and the peripherals speed V2 become substantially the same level in Embodiment 1, these speeds are not exactly consistent. This is because when these speeds are exactly consistent with one another, the value of the speed variation becomes large as illustrated in FIG. 13. The X-axis of FIG. 13 indicates a ratio of the peripheral speed V2 relative to the surface speed V1. On the positive side of the X-axis, the peripheral speed V2 is faster than the surface speed V1, and on the negative side of the X-axis, the surface speed V1 is faster than the peripheral speed V2. The ratio of the peripheral speed V2 relative to the surface speed V1 is changed from minus twenty percent (−20%) to plus thirty percent (+30%). The value of the speed variation along the Y-axis of FIG. 13 is obtained by averaging the varying speeds in FIG. 7A over a predetermined time duration, but not by applying the FFT to the speed variation.

In FIG. 13, the speed variation has a local maximum value B at around a speed ratio between V1 and V2 of plus one percent (+1%). This speed variation influences the value of the speed frequency at the one cog frequency. In the printing mode, the speed ratio, at which the value of the speed variation is locally maximum (point B), is avoided. For example, the primary transferring motor 41 and the secondary transferring motor 42 are controlled to use the speed ratio at or near a point A.

Figure 14B:
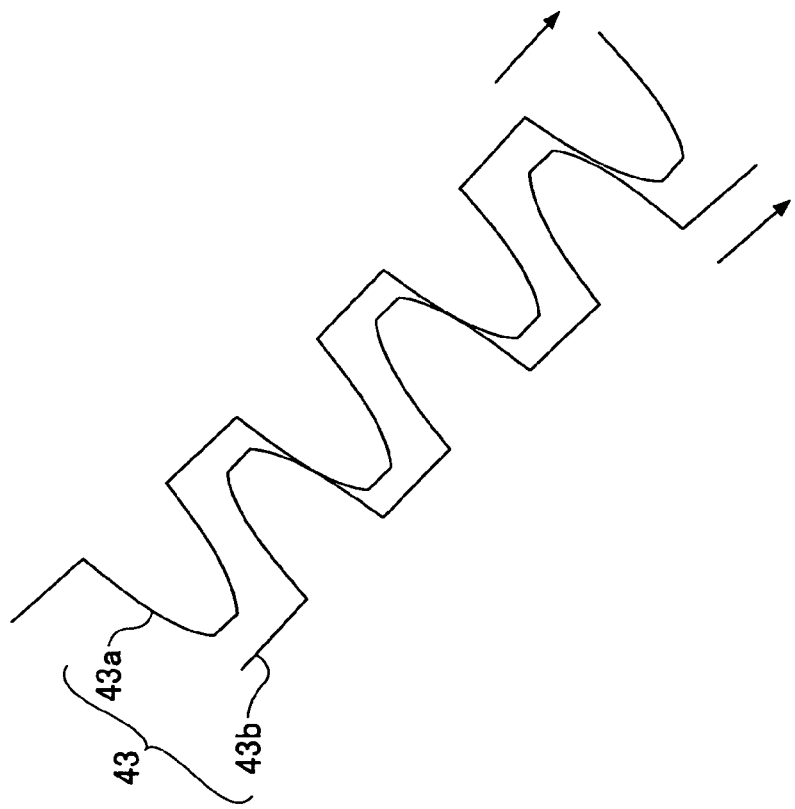
FIG. 14B schematically illustrates the translation of cogs in another leading and trailing relationship, as an example.
Figure 14A:
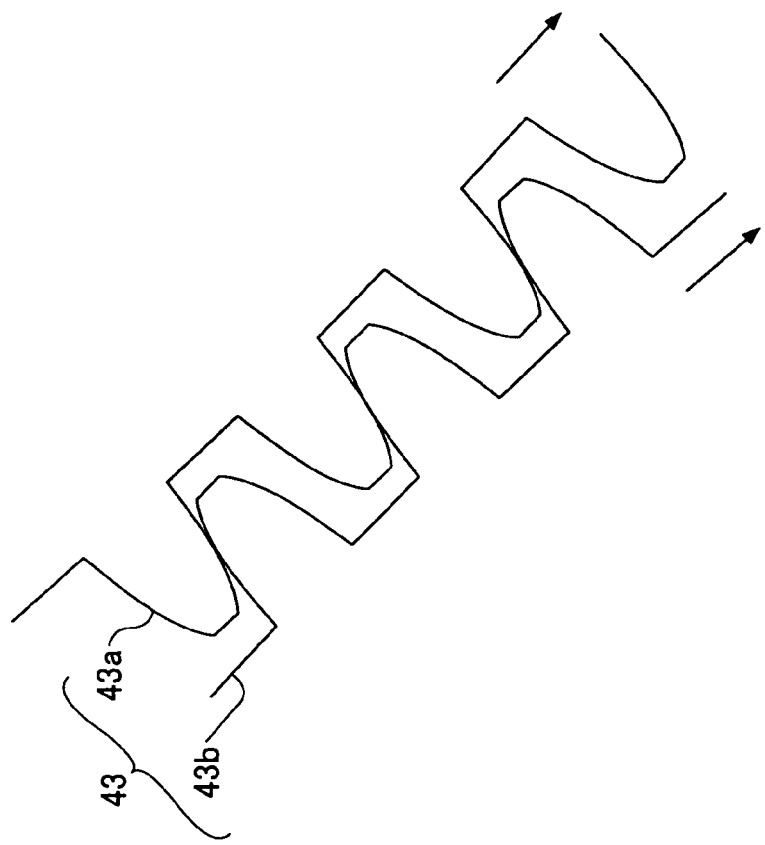
FIG. 14A schematically illustrates a translation of cogs in a leading and trailing relationship, as an example.

FIG. 14A schematically illustrates a decelerating mechanism 43 when the primary transferring motor 41 and the secondary transferring motor 42 are controlled to be in the minus speed ratio range. FIG. 14B schematically illustrates the decelerating mechanism 43 when the primary transferring motor 41 and the secondary transferring motor 42 are controlled to be in the plus speed ratio range. When the surface speed V1 is faster than the peripheral speed V2, the primary transferring motor 41 mainly drives the intermediate transferring belt 14. Therefore, the gear 43b is lead by the gear 43a. Under this situation, the gear 43b on the primary transferring roller does not move so much along the engagement gap. Therefore, the speed variation is stabilized more as the speed ratio becomes small on the negative side.

When the peripheral speed V2 of the secondary transferring rotor 18 is faster than the surface speed V1 of the intermediate transferring belt 14, the secondary transferring motor 42 mainly drives the intermediate transferring belt 14. Therefore, the gear 43a is lead by the gear 43b as illustrated in FIG. 14B. Under the situation, the gear 43b on the primary transferring roller does not move so much along the engagement gap. Therefore, the speed variation is stabilized more as the speed ratio becomes large on the positive side.

Due to the above reasons, the rotational speed of the secondary transferring motor 42 is controlled to cause the speed ratio relative to the rotational speed of the primary transferring motor 41 to be at or near the point A in the printing mode.

(Electric Current Value of the Primary Transferring Motor 41)

Figure 15:
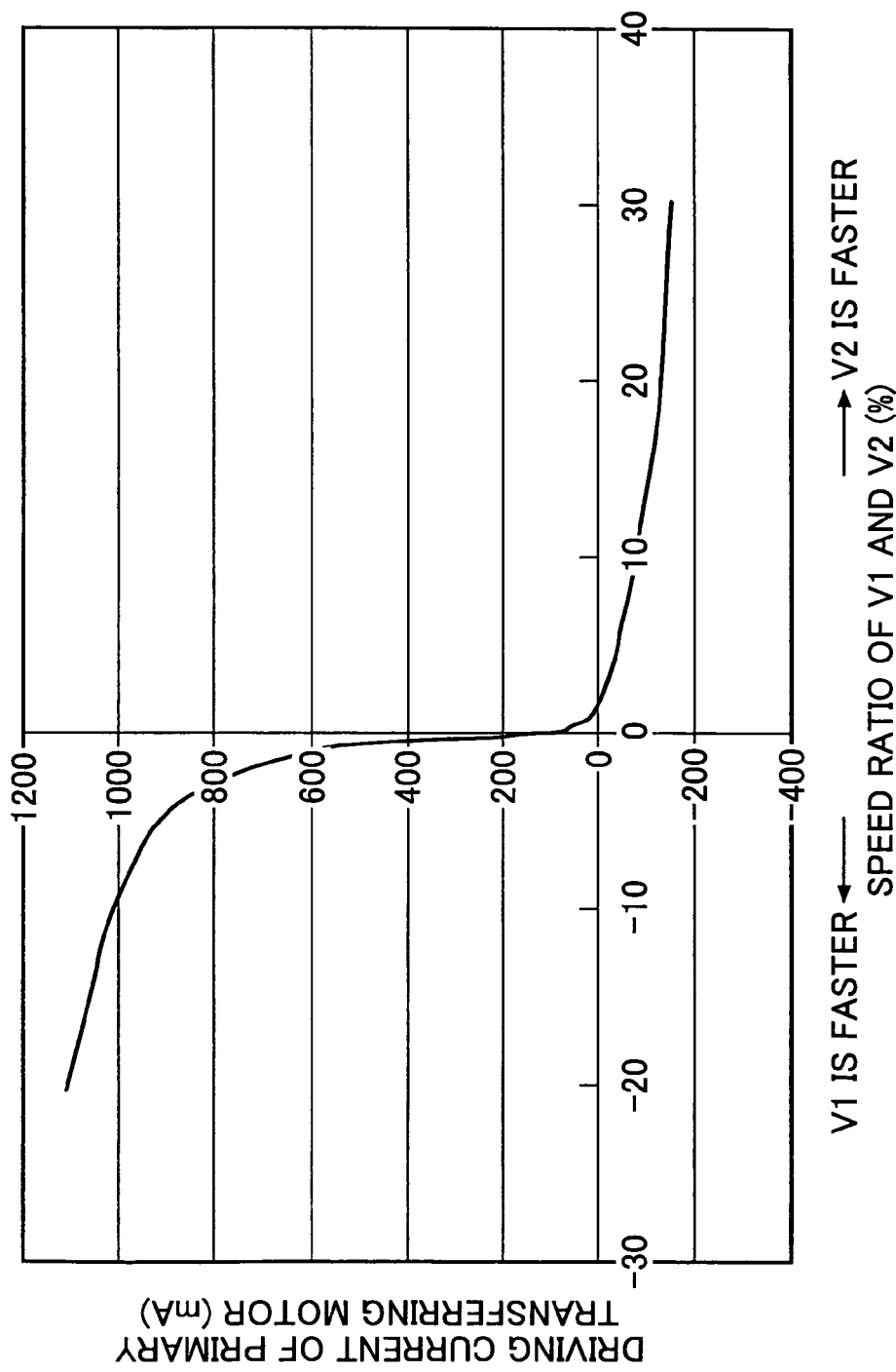
FIG. 15 is a graph illustrating a relationship of a speed ratio between a surface speed and a peripheral speed to an electric current value of a primary transferring motor, as an example.

FIG. 15 is a graph illustrating a relationship of a speed ratio between the surface speed V1 and the peripheral speed V2 with the electric current value of the primary transferring motor 41. In a manner similar to FIG. 13, the speed ratio is changed from minus twenty percents (−20%) to plus thirty percents (+30%). When the speed ratio becomes about one percent (1%), a driving current of the primary transferring motor 41 becomes substantially zero. Referring also to FIG. 13, it is known that the speed variation has the local maximum value when the driving current is substantially zero. It is possible to explain this condition as follows. When there is a load on such as the intermediate transferring belt 14 (on the negative side of FIG. 13), the load works in a direction of stopping the rotation of the primary transferring motor 41. Therefore, force is applied in one direction to rotate the primary transferring motor 41, and the gear 43b continues to be driven by the gear 43a while being in contact with a forward side of the gear 43a in FIG. 14A.

When the rotational speed of the secondary transferring motor 42 is gradually reduced (when the speed ratio is positive), the primary transferring motor 41 substantially reaches the target speed with the secondary transferring motor 42. In this case the primary transferring motor 41 is lead by the secondary transferring motor 42 and the electric current value of the primary transferring motor 41 becomes substantially zero. Therefore, the one way of force is not given to the gear 43b, and therefore the gear 43b becomes unstable. As a result, cogs of the gear 43b are apt to move around within the engagement gaps, to thereby cause prominent speed variation. In other words, the local maximum value of the speed variation in FIG. 13 may be obtained. Here, the speed variation in FIG. 13 may be caused by torsion of a shaft or the like. However, the major reason is the unstable movement of the gear 43b. The reason why the driving current does not become zero when the speed ratio is zero is that the primary transferring motor 41 has a load of blades (e.g. inertia) or the like.

Meanwhile, when the rotational speed of the secondary transferring motor 42 is gradually increased to strongly influence leading of the secondary transferring roller 18 relative to the primary transferring motor 41, the motor driving circuit 54 is driven in a direction adverse to that in the normal load (the side of the point A) in order to maintain the primary transferring motor 41 rotating at the target speed. In this situation, the gear 43b continues to be engaged with the gear 43a in FIG. 14B while being in contact with the backward side of the gear 43a only in one direction.

Therefore, in order to prominently detect the speed variation, it is preferable to make cogs of the gear 43b be unstable between the cogs of the gear 43a. In other words, it is preferable to detect the speed variation when the electric current of the primary transferring motor 41 is zero.

The image forming device 100 of Embodiment 2 controls the secondary transferring motor 42 to maintain the surface speed V1 of the intermediate transferring belt 14 to be the target speed and to simultaneously make the electric current of the primary transferring motor 41 be zero. In this way, it is possible to amplify only the speed variation influenced by the engagement gaps between the gears 43a and 43b and detect the predictor of wear of the gears 43a and 43b.

(Control of the Secondary Transferring Motor 42)

In the wear detecting mode of Embodiment 2, the secondary transferring motor 42 is not controlled such that the peripheral speed V2 of the secondary transferring roller 18 is consistent with the surface speed V1. Therefore, an image is not formed on the paper P in the wear detecting mode.

As illustrated in FIG. 5 of Embodiment 1, the driving current of the inverter 56 is output to the secondary transferring motor controller 61. The secondary transferring motor controller 61 compares a driving current of the primary transferring motor 41 with an electric current of zero as the target value, and determines a speed, which is reported to the motor driving signal generating unit 57 after calculating an operation in conformity with, for example, PID control. It is not always necessary to make the driving current of the primary transferring motor 41 be zero, and it is possible to obtain a similar amplifying effect using plus several milli-volts (mV) thru minus several milli-volts (mV). Further, the amplifying effect is obtainable by using plus several tens of milli-volts (mV) thru minus several tens of milli-volts (mV). Said differently, it is sufficient to limit an absolute value of the driving current of the primary transferring motor 41 to be within a predetermined value range.

Further, based on the speed ratio, in which the speed variation is the maximum, as illustrated in FIG. 13, the driving current of the primary transferring motor 41 can be determined as a target of the secondary transferring motor controller 61. In this case, the control device 200 detects the speed variation while changing the speed ratio of the surface speed V1 and the peripheral speed V2, and determines the electric current of the primary transferring motor 41 which maximizes the speed variation. Further, the electric current of the primary transferring motor 41 causing the speed ratio to be minus several milli-volts (mV) thru plus several milli-volts (mV) around the speed ratio maximizing the speed variation may be determined as the driving current of the primary transferring motor 41 and as the target of the secondary transferring motor controller 61.

The motor driving signal generating unit 57 compares the constant voltage determined based on the information (instruction) of the speed with, for example, a triangular wave (carrier wave) having a predetermined frequency, thereby determining a duty ratio of a PWM signal from an intersecting point of the constant voltage and the triangle wave. The motor driving signal generating unit 57 generates a PWM signal having the duty ratio and outputs it to the six FETs. In this way, the rotational speed of the secondary transferring motor 42 is controlled so that the electric current value of the primary transferring motor 41 becomes zero.

(Functional Block)

Figure 16A:
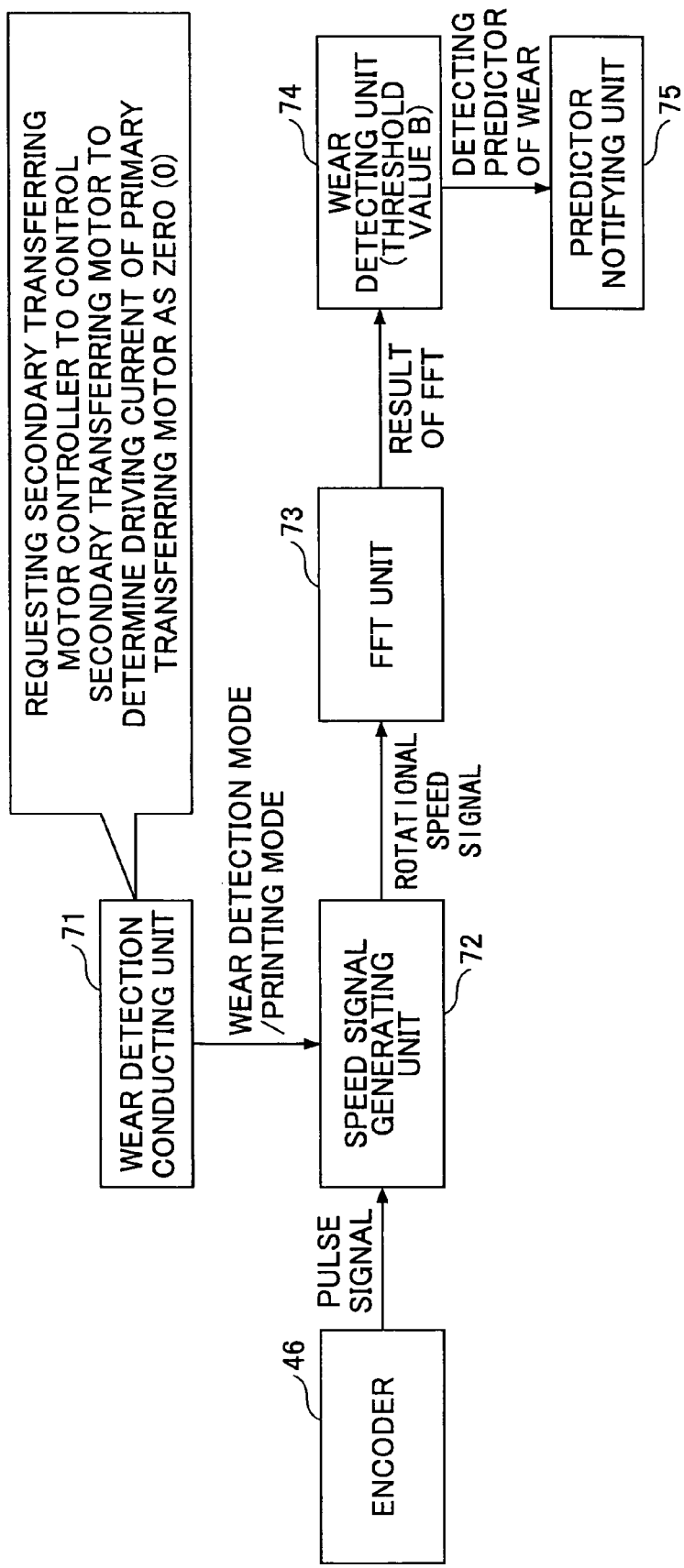
FIG. 16A is a functional block diagram specific to control device in Embodiment 2, as an example.

FIG. 16A is an example of the functional block diagram of Embodiment 2. In FIG. 16A, the same reference signs are attached to portions the same as those in FIG. 6A, and descriptions of these portions are omitted. In Embodiment 2, the wear detection conducting unit 71 requests the secondary transferring motor controller 61 to control the secondary transferring motor 42 so that the driving current of the primary transferring motor 41 becomes zero. The wear detection conducting unit 71 requires a speed signal generating unit 72 to generate the speed signal when the electric current of the primary transferring motor 41 becomes zero. The speed signal generating unit 72 generates a speed signal when the value of the speed variation at the one cog frequency is amplified, and the FFT unit 73 calculates a result of the FFT process. The wear detecting unit 74 compares the value of the speed variation at the one cog frequency in the result of the FFT process with a threshold value B, and detects the predictor of wear when the value exceeds the threshold value B.

FIG. 17 graphically illustrates a relationship between the speed variation of the one cog frequency and the threshold value B, as an example. FIG. 17 illustrates a result of the FFT process as in FIG. 12. The value of the speed variation at the one cog frequency exceeds the threshold value B due to wear of the gears 43a and 43b. When such a result of the FFT process is acquired, the wear detecting unit 74 detects the predictor of wear. The threshold value B is larger than the threshold value A. However, the threshold B may be determined by any one of a method of previously registering in the image forming device 100 and a method of setting with the image forming device 100.

(Operating Procedure)

Figure 18:
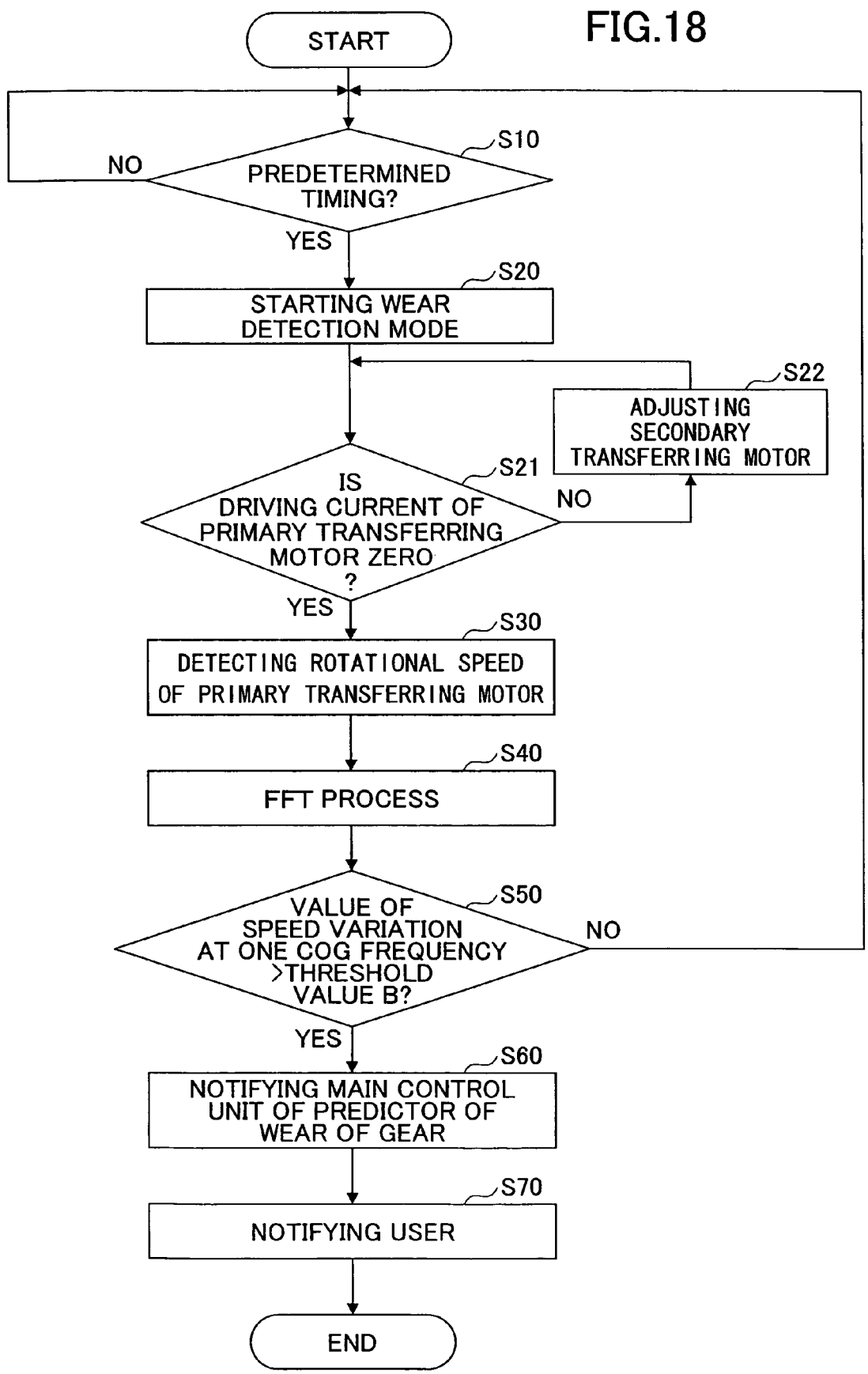
FIG. 18 is a flow diagram illustrating a procedure of detecting a predictor of wear with control device, as an example.

FIG. 18 is a flow diagram illustrating a procedure of detecting the predictor of wear with the control device of Embodiment 2. The flow diagram in FIG. 18 starts when a power source of the image forming device 100 is turned on, and the main control unit 52 and the motor driving circuit 54 completely start up, for example.

First, the wear detection conducting unit 71 determines whether predetermined timing comes in S10. After the predetermined timing comes in YES of step S10, for example, a predetermined time period elapses from a previous detection of wear, the image forming device 100 is switched to the wear detection mode by the wear detection conducting unit 71 in S20. In the wear detecting mode, the motor driving circuit 54 controls the secondary transferring motor 42 so that the driving current of the primary transferring motor 41 becomes zero.

The wear detection conducting unit 71 determines whether the driving current of the primary transferring motor 41 is zero in step S21. When the driving current of the primary transferring motor 41 is not zero in NO of step S21, the motor driving circuit 54 adjusts the rotational speed of the secondary transferring motor 42 in step S22.

When the driving current of the primary transferring motor 41 becomes zero in YES of step S21, the wear detection conducting unit 71 requires the speed signal generating unit 72 to generate the speed signal. Therefore, the speed signal generating unit 72 generates a signal of a rotational speed of the driving roller 16 from a pulse signal output from an encoder 46. Time duration while the signal of the rotational speed is generated is about the time duration while the intermediate transferring belt 14 rotates one turn. By this, the speed variation can be detected while reducing the influence of rotational position of the intermediate transferring belt 14.

The FFT unit 73 applies a FFT process to the signal of the rotational speed and calculates a result of the FFT process in S40. The wear detecting unit 74 determines whether the value of the speed variation at the one cog frequency is larger than the threshold value B in step S50.

When the value of the speed variation at the one cog frequency is not larger than the threshold value B in NO of step S50, the wear detection conducting unit 71 finishes the wear detection mode. In this way, the image forming device 100 returns to the printing mode. Therefore, the wear detection conducting unit 71 waits for the next predetermined timing in step S10. When the value of the speed variation at the one cog frequency is larger than the threshold value B in YES of step S50, a predictor notifying unit 75 notifies the main control unit 52 of the predictor of wear in step S60. In receipt of the notification, the main control unit 52 displays a message on, for example, the operation unit 51 in step S70. Therefore, by comparing the value of the speed variation at the one cog frequency with a appropriate threshold value, the predictor of wear may be detected.

(Modified Example of the Operation Procedure)

Figure 19:
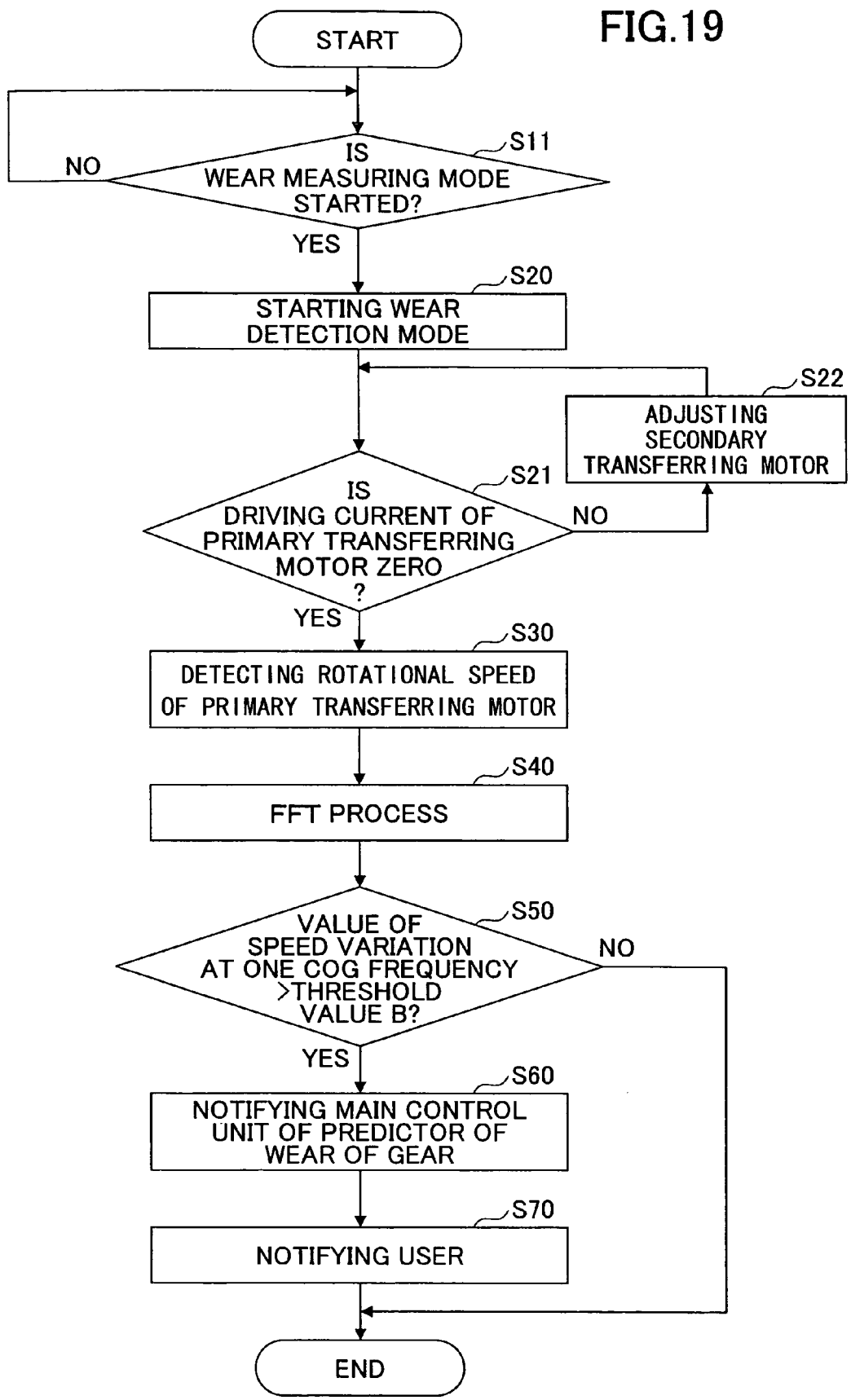
FIG. 19 is a flow diagram illustrating a procedure of detecting the predictor of wear with control device in Embodiment 2, as a modified example.

FIG. 19 is a flow diagram illustrating a procedure of detecting the predictor of wear with an image forming device 100 of Embodiment 2, as an example. In FIG. 19, the same reference signs are attached to the same steps as those in FIG. 18, and descriptions of these steps are omitted.

Referring to FIG. 19, the image forming device 100 is switched to the wear detection mode when a user or a serviceman for maintenance service operates the operation unit 51. Said differently, the wear detection mode is started due to the operations in steps S11 and S20.

The following processes are similar to those in FIG. 18. However, because it is unnecessary to wait for the predetermined timing in FIG. 19, when a value of the speed variation at the one cog frequency is not larger than the threshold value B in NO of step S50, the wear detection conducting unit 71 finishes the process itself. Therefore, when the user or the serviceman compares the value of the speed variation at the one cog frequency with an appropriate threshold value at predetermined timing, the predictor of wear can be detected.

(Prediction of the Predictor of Wear)

In Embodiment 2 also, the image forming device 100 of Embodiment 1 not only compares the threshold value B with the value of the speed variation at the one cog frequency but also predicts the predictor of wear from a transition of the value of the speed variation.

Figure 16B:
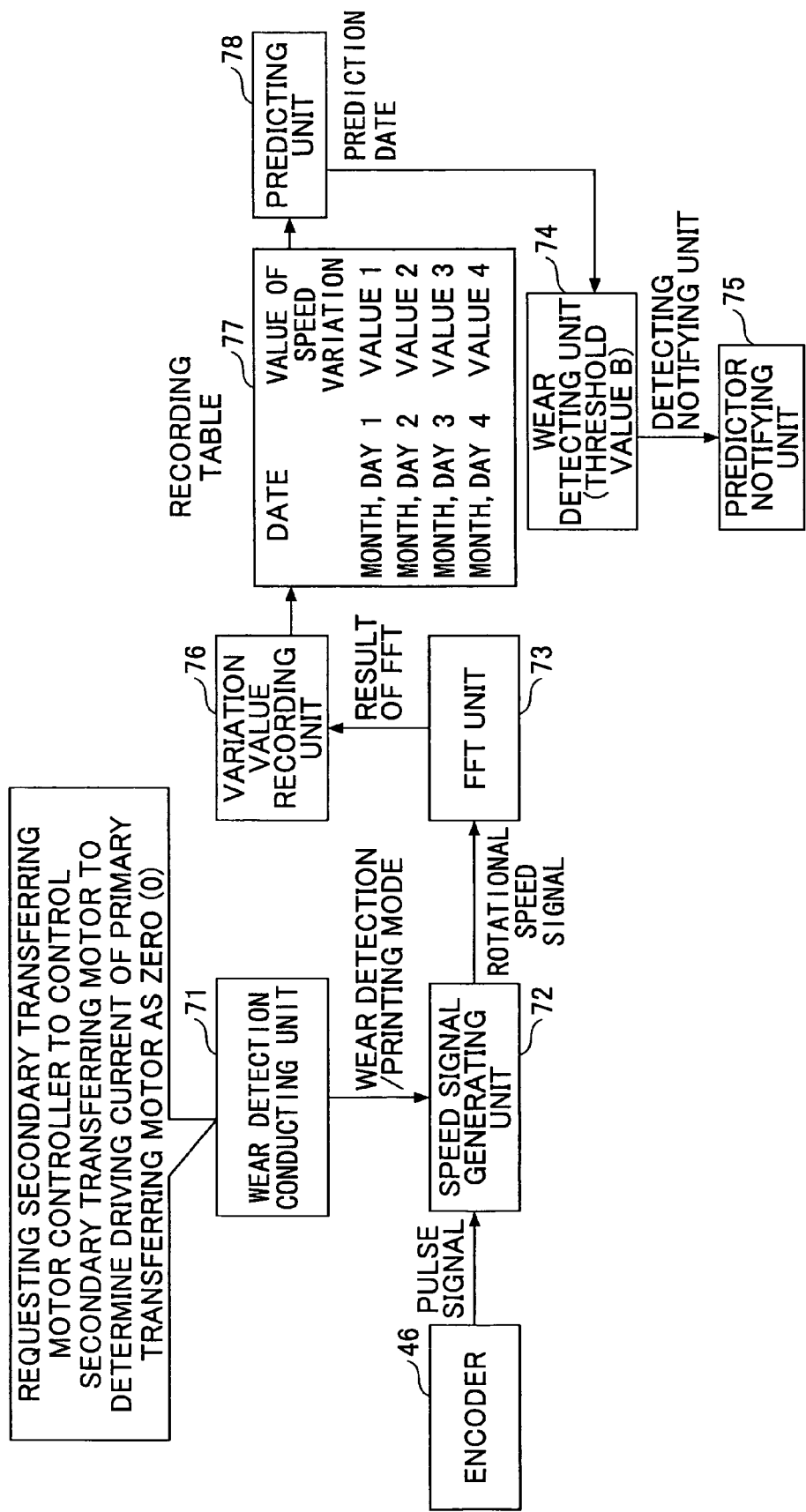
FIG. 16B is another functional block diagram specific to the control device in Embodiment 2, as an example.

Referring back to FIG. 16B, FIG. 16B is a functional block diagram specific to the control device 200 which detects the predictor of wear, as an example. In FIG. 16B, the same reference signs are attached to the same portions as those in FIG. 16A, and descriptions of these portions are omitted. A predicting method with a predicting unit 78 is the same as that in Embodiment 1.

Figure 20:
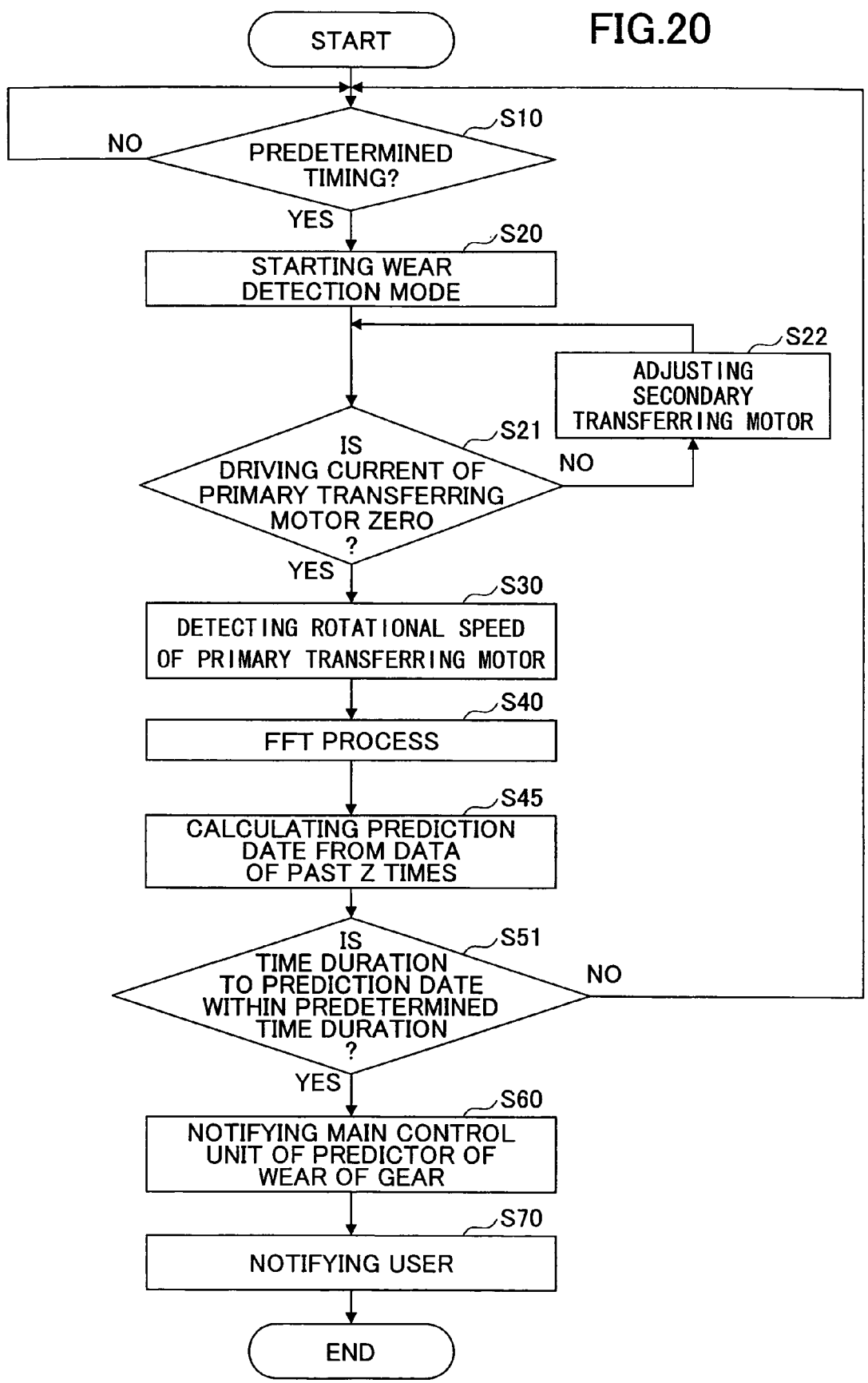
FIG. 20 is a flow diagram illustrating a procedure of detecting the predictor of wear with the control device in Embodiment 2, as an example.

FIG. 20 is a flow diagram illustrating a procedure of detecting the predictor of wear with the image forming device 100 of Embodiment 2, as an example. The flow diagram in FIG. 20 starts when the power source of the image forming device 100 is turned on, and the main control unit 52 and the motor driving circuit 54 completely start up, for example.

First, the wear detection conducting unit 71 determines whether a predetermined timing comes in S10. After the predetermined timing comes in YES of step S10, for example, a predetermined time period elapses from a previous detection of wear, the image forming device 100 is switched to the wear detection mode by the wear detection conducting unit 71 in S20. The switching to the wear detection mode may be done by operating the operation unit 51. In the wear detecting mode, the motor driving circuit 54 controls the secondary transferring motor 42 so that the driving current of the primary transferring motor 41 becomes zero.

The wear detection conducting unit 71 determines whether the driving current of the primary transferring motor 41 is zero in step S21. When the driving current of the primary transferring motor 41 is not zero in NO of step S21, the motor driving circuit 54 adjusts the rotational speed of the secondary transferring motor 42 in step S22.

When the driving current of the primary transferring motor 41 becomes zero in YES of step S21, the wear detection conducting unit 71 requires the speed signal generating unit 72 to generate the speed signal. Therefore, the speed signal generating unit 72 generates a signal of the rotational speed of the driving roller 16 from the pulse signal output from the encoder 46. Time duration while the signal of the rotational speed is generated is about the time duration while the intermediate transferring belt 14 rotates one turn. By this, the speed variation can be detected while reducing the influence of the rotational position of the intermediate transferring belt 14.

The FFT unit 73 applies the FFT process to the signal of the rotational speed and calculates the result of the FFT process in S40. The variation value recording unit 76 records the current date and the value of the speed variation in the recording table 77.

The prediction unit 78 calculates the prediction date based on data of past Z times. Here, the Z times are a number sufficient for calculating a regression line, for example five to ten times. It is also possible to calculate the regression line by using all of past data.

The wear detecting unit 74 determines whether the time duration to the prediction date is within a predetermined time duration in step S51.

When if the time duration is not within the predetermined time duration in NO of step S51, the wear detection conducting unit 71 finishes the wear detection mode. In this way, the image forming device 100 returns to the printing mode. Therefore, the wear detection conducting unit 71 waits for the next predetermined timing in step S10. In this way, the image forming device 100 returns to the printing mode. Therefore, the wear detection conducting unit 71 waits for next predetermined timing in step S10. When the time duration until the prediction date is within the predetermined time duration in YES of step S51, the predictor notifying unit 75 notifies the main control unit 52 of prediction of the predictor of wear of the gears 43a and 43b in step S61. In receipt of the notification, the main control unit 52 displays a message on, for example, the operation unit 51 in step S70. Therefore, it is possible to early predict an event in which the predictor of wear is detected by amplifying the value of the speed variation at the one cog frequency and calculating the prediction date when the speed variation at the one cog frequency exceeds the threshold value B in use of values of past speed variations.

As described above, the image forming device 100 of Embodiment 2 controls the secondary transferring motor 42 so that the driving current of the primary transferring motor 41 becomes zero. Therefore, the speed variation at the one cog frequency can be amplified and the prediction of wear of the gears 43a and 43b can be detected.

In Embodiment 2, the image forming device 100 having the intermediate transferring belt 14 has been exemplified. However, the predictor of wear of the gears 43a and 43b can also be detected in the image forming device 100 including an intermediate transferring drum 79 instead of the intermediate transferring belt 14.

Figure 21:
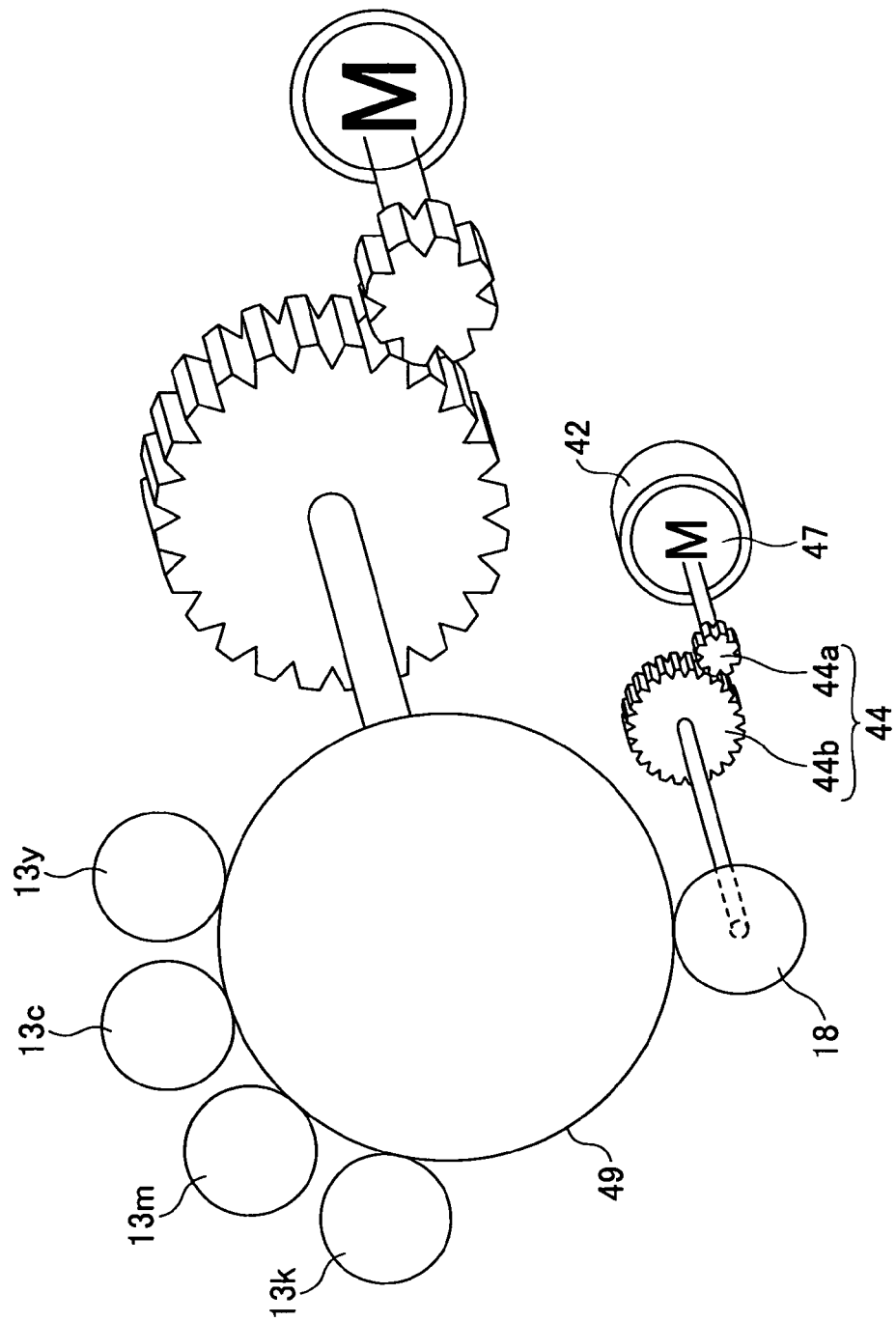
FIG. 21 schematically illustrates an intermediate transfer drum, as an example.

FIG. 21 schematically illustrates an intermediate transfer drum 79, as an example. As illustrated, image forming units 13k thru 13y form a toner image on the intermediate transferring drum 79. The gears 43a and 43b are worn in such an image forming device 100. Further, because the secondary transferring roller 18 interferes with the intermediate transferring drum 79, it is possible to cause one of the gears 43a and 43b to not be lead by the other gear or not to lead the other gear while straying inside the engagement gaps.

Therefore, a detecting method of the predictor of wear in Embodiment 2 can be preferably applied to an image forming device in which driving force of one motor and driving force of another motor mutually interfere.

Accordingly, Embodiments 1 and 2 of the present invention can provide control device, an image forming device, a wear detecting method, a program, and a storage device, which can early detect wear of a gear transmitting a rotation of a motor.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2009-003476 filed on Jan. 9, 2009, the entire contents of which are hereby incorporated herein by reference.

What is claimed is:

1. A control device controlling a rotational speed of a rotated body, the control device comprising:

a transmission unit configured to include a first gear rotating along with a motor shaft of a motor and a second gear rotating along with a rotating roller which drives the rotated body and to be formed by the first gear and the second gear, engaged to transmit rotation of the motor shaft;

a speed detecting unit configured to detect the rotational speed of the rotated body or the rotating roller in association with time;

a motor controlling unit configured to control the motor to have a constant motor shaft rotational speed based on the rotational speed;

a converting unit configured to convert the rotational speed detected in association with the time to a relationship between a frequency contained in variation of the rotational speed in association with the time and a variation value indicative of magnitude of the variation of the rotational speed;

a variation value recording unit configured to record the variation value of the past at the specified frequency in association with date information indicative of data when the variation value is acquired;

a predicting unit configured to predict a date when the variation value exceeds a threshold value from the plural variation values of the past stored in a memory; and a wear detecting unit configured to detect a predictor of wear of cogs included in at least one of the first gear and the second gear when the variation value at a specified frequency, which is determined based on a number of the cogs of the first gear and the motor shaft rotational speed of the motor, exceeds the threshold value, wherein the wear detecting unit detects the predictor of wear when a number of residual days until the variation value exceeds the threshold value is less than a set value.

2. The control device according to claim 1, wherein an engagement gap between the first gear and the second gear influences the variation value at the specified frequency.

3. The control device according to claim 1, further comprising:

a predictor notifying unit configured to notify a user of a date when the variation value exceeds the threshold value or days until the date.

4. The control device according to claim 1, further comprising:

a predictor notifying unit configured to notify a user of detection of the predictor of wear.

5. The control device according to claim 4, further comprising:

a display unit configured to display a message indicative of detection of the predictor of wear upon instruction from the predictor notifying unit.

6. The control device according to claim 1, further comprising:

a wear detection conducting unit configured to start a wear detection mode which detects the predictor of wear at a set time period.

7. The control device according to claim 6, further comprising:

an operation unit configured to receive operation; and a wear detecting unit configured to detect the predictor of wear when the wear detecting unit receives the operation of conducting the wear detection mode input from the operation unit.

8. A control device controlling a first rotational speed of a rotated body, the control device comprising:

a transmission unit configured to include a first gear and a second gear, the transmission unit transmits rotation to a first rotational roller, which drives the rotated body, via the first gear and the second gear;

a speed detecting unit configured to detect the first rotational speed of the rotated body or the first rotating roller in association with time;

a first motor controlling unit configured control the first motor to have a constant first motor shaft rotational speed based on the first rotational speed;

a second rotational roller configured to directly contact the rotated body or to contact the rotated body via a recording medium, the second rotational roller is configured to be enabled to interfere with the rotation of the rotated body;

a second motor configured to rotationally drive the second rotational roller;

a second motor controlling unit configured to control a second motor shaft rotational speed of the second motor such that a load of the first motor is decreased to a predetermined value or less;

a converting unit configured to convert the first rotational speed detected in association with the time to a relationship between a frequency contained in variation of the first rotational speed in association with the time and a variation value indicative of a magnitude of the variation of the first rotational speed; and a wear detecting unit configured to detect a predictor of wear of cogs included in at least one of the first gear and the second gear when the variation value at a specified frequency, which is determined based on a number of the cogs of the first gear and the first motor shaft rotational speed of the first motor, exceeds a threshold value.

9. The control device according to claim 8, further comprising:

an electric current detecting unit configured to detect a driving current of the first motor, wherein the second motor controlling unit controls the second rotational speed of the second motor to maintain the driving current to be zero or as close to zero.

10. The control device according to claim 8, further comprising:

an electric current detecting unit configured to detect a driving current of the first motor, wherein the second motor controlling unit controls the second motor shaft rotational speed of the second motor so that an absolute value of the driving current is maintained to be in a set range including zero.

11. The control device according to claim 8, wherein the second motor controlling unit controls the second rotational shaft speed of the second motor so that a speed ratio of a peripheral speed of the second rotational roller relative to the first rotational roller becomes a speed ratio at which the variation value shows a local maximum value when the variation value is graphed relative to the speed ratio.

12. The control device according to claim 8, wherein the specific frequency is determined by multiplying a number of the cogs of the first gear by the first motor shaft rotational speed.

13. A wear detecting method of detecting wear of a transmission unit including a first gear rotating with a motor shaft of a motor and a second gear rotating with a rotating roller which drives a rotated body and to be formed by the first gear and the second gear, engaged to transmit the rotation of the motor shaft, the wear detecting method comprising:

detecting, with a speed detecting unit, the rotational speed of the rotated body or the rotating roller in association with time;

controlling, with a motor controlling unit, the motor to have a constant motor shaft rotational speed based on the rotational speed;

converting, with a converting unit, the rotational speed detected in association with the time to a relationship between a frequency contained in a variation of the rotational speed in association with the time and a variation value indicative of a magnitude of the variation of the rotational speed;

recording, with a variation value recording unit, the variation value of the past at the specified frequency in association with date information indicative of data when the variation value is acquired;

predicting, with a predicting unit, a date when the variation value exceeds a threshold value from the plural variation values of the past stored in a memory; and detecting, with a wear detecting unit, a predictor of wear of cogs included in at least one of the first gear and the second gear when the variation value at a specified frequency, which is determined based on a number of the cogs of the first gear and the motor shaft rotational speed of the motor, exceeds the threshold value, wherein the wear detecting unit detects the predictor of wear when a number of residual days until the variation value exceeds the threshold value is less than a set value.

* * * * *